Oct. 9, 1956  A. T. COURT  2,765,889
AUTOMOTIVE VEHICLE CONTROL
Filed Aug. 18, 1952  4 Sheets-Sheet 1
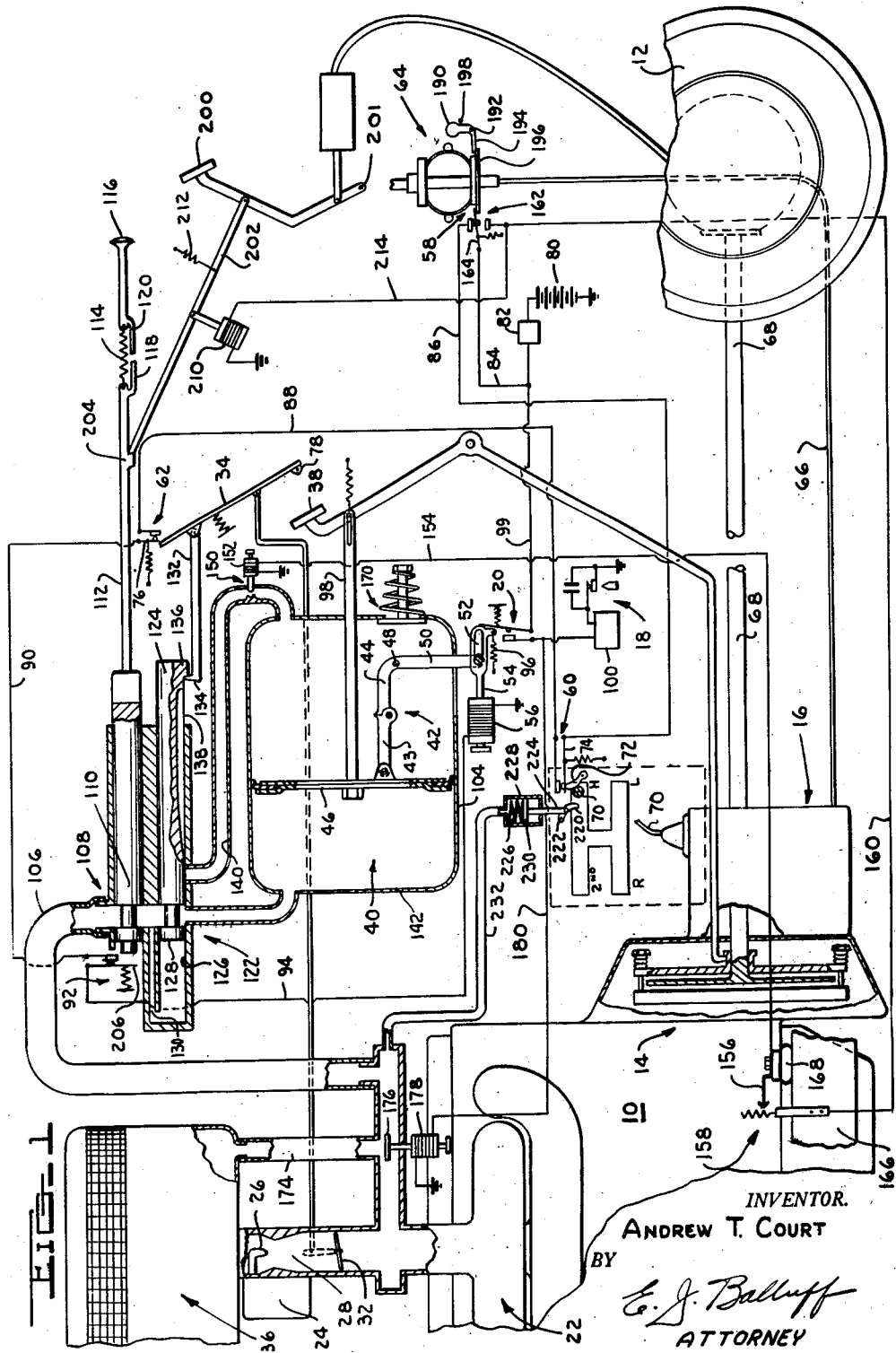
INVENTOR.
ANDREW T. COURT
BY
E. J. Balluff
ATTORNEY

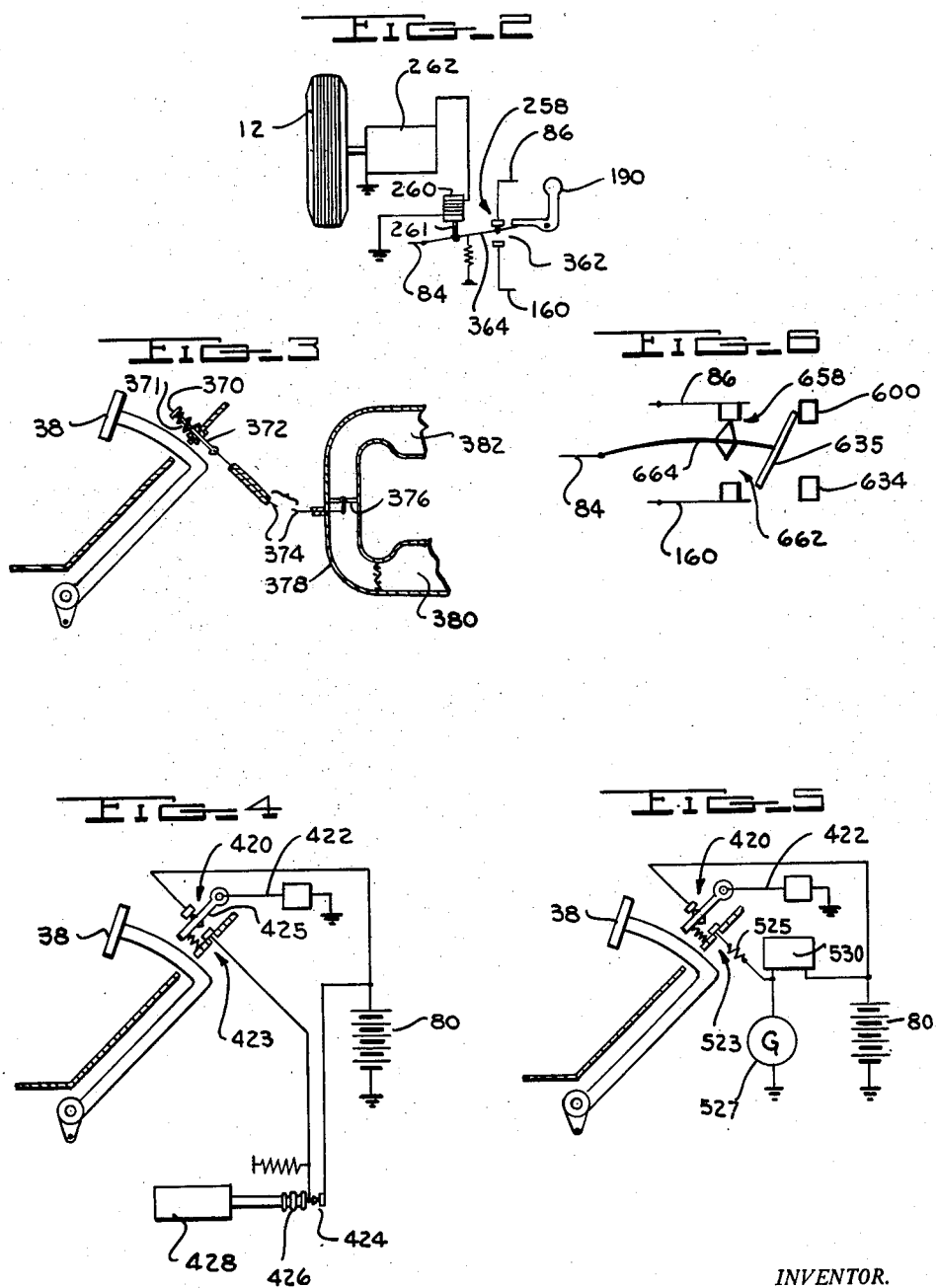

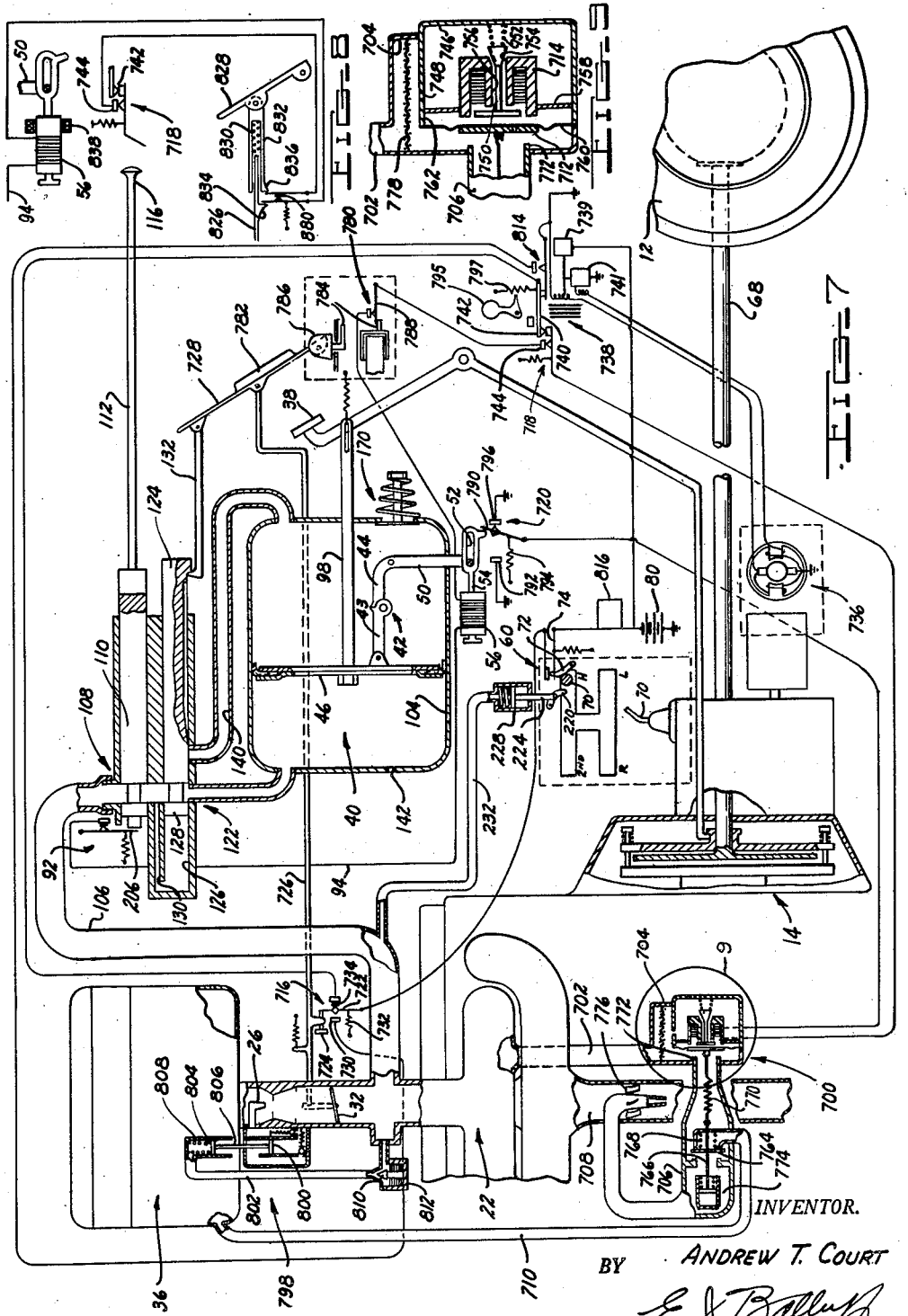
Oct. 9, 1956  A. T. COURT  2,765,889
AUTOMOTIVE VEHICLE CONTROL
Filed Aug. 18, 1952  4 Sheets-Sheet 3
INVENTOR.
BY ANDREW T. COURT
ATTORNEY

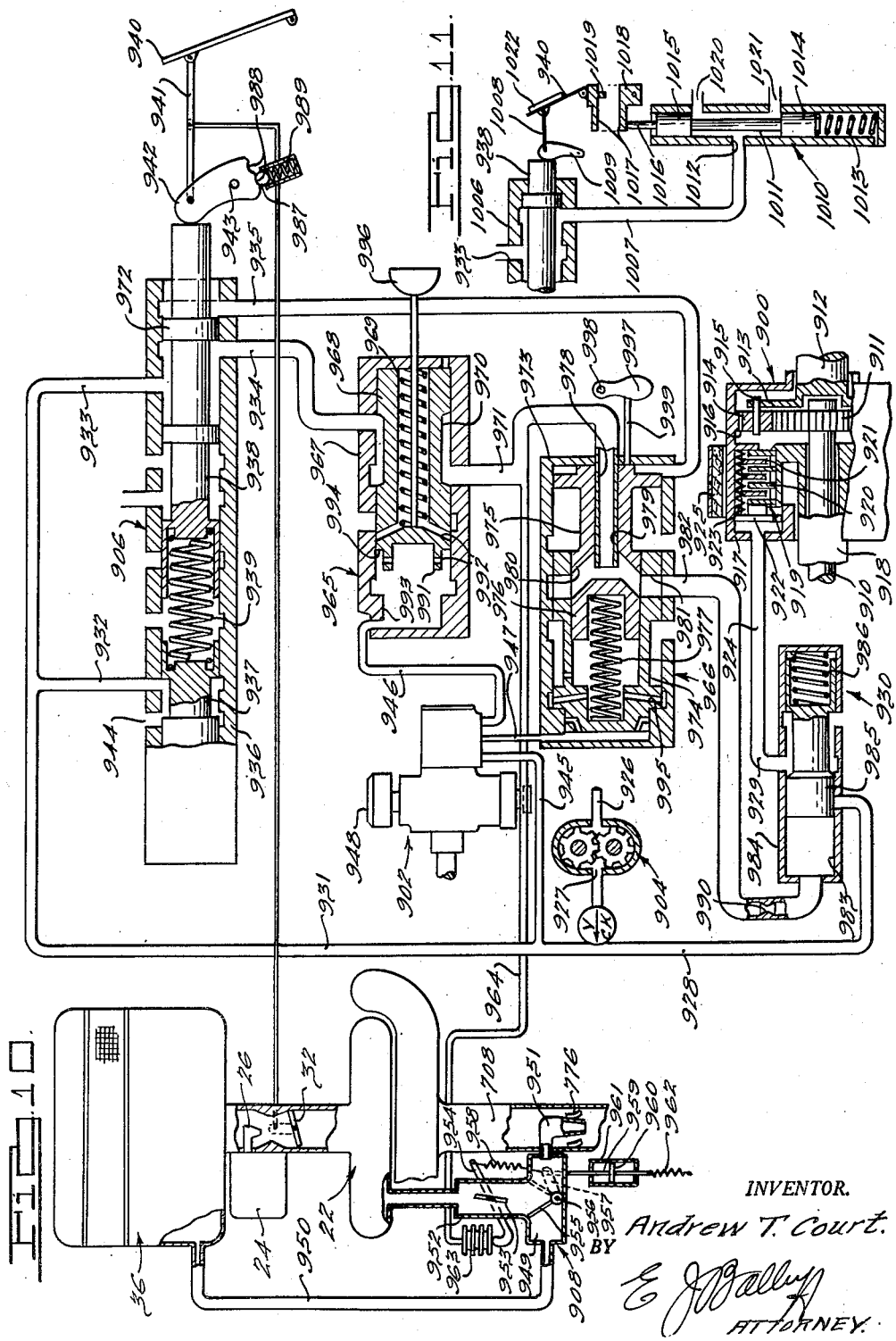

United States Patent Office 2,765,889
Patented Oct. 9, 1956

2,765,889

AUTOMOTIVE VEHICLE CONTROL

Andrew T. Court, Detroit, Mich.

Application August 18, 1952, Serial No. 304,901

69 Claims. (Cl. 192—.09)

This invention relates to automotive vehicles employing internal combustion engines and has particular reference to certain new and useful improvements whereby the mileage per gallon can be increased up to 60 percent.

One of the most widely understood and accepted methods of increasing the efficiency of an internal combustion engine is by raising the initial compression of the explosive charge, and it has been suggested that engines having a compression ratio of 12 to 1 will yield a substantial increase in gasoline mileage when suitable fuel therefor is available. While this method of obtaining greater efficiency from an internal combustion engine appears to offer definite possibilities, it must be delayed until suitable fuels are available on a national basis, and in addition such high compression engines require a basic redesign of the engine construction.

This invention contemplates certain new and useful improvements whereby existing internal combustion engines using existing types of fuels may be employed on a materially more efficient basis than now used, and to this end certain controls are provided which make it possible sharply to increase the average compression at moderate speed operation of the engine without any change in the design thereof or the fuel employed.

This invention makes it possible to obtain substantial fuel savings with present types of engines using present types of fuels. It also may be installed on previously manufactured cars at a moderate expense, thereby extending the benefits to the owners of the millions of vehicles now in use. In addition, the invention reduces the amount of work which the driver must do in order to drive a conventional car having a change speed transmission, and by the employment of the invention engine wear is reduced due to the fact that the engine operates only a part of the time that the car is in motion.

Principal objects of the invention, therefore, are to provide:

A new and improved automotive vehicle;

A new and improved control arrangement for operating an automotive vehicle having an internal combustion engine whereby increased efficiency may be obtained and wear on the engine and the drive system of the vehicle may be reduced;

A new and improved automotive vehicle having an internal combustion engine in which the engine needs to operate only part of the time that the car is in motion, whereby materially improved fuel economy may be obtained and engine wear reduced; and An automotive vehicle control which automatically provides for coasting with a dead engine, with or without disconnecting the drive between the engine and the drive wheels, and for restarting the engine under various conditions so as to permit the car to be power driven.

Other and further objects of the invention will be apparent from the following description and claims and will be understood by reference to the accompanying drawings, of which there are four sheets, which by way of illustration show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a schematic view of an automotive vehicle embodying the invention;

Figs. 2 to 6 are schematic views illustrating modifications of the invention;

Fig. 7 is a schematic view of an automotive vehicle embodying a further modified form of the invention;

Fig. 8 is a fragmentary view of a modified form of an accelerator pedal control for use with the device shown in Fig. 7;

Fig. 9 is an enlarged fragmentary view of that part of the by-pass device enclosed within the circle numbered 9 in Fig. 7;

Fig. 10 is a schematic view of a further modification of the invention; and

Fig. 11 shows a modification of a part of the device illustrated in Fig. 10.

As shown in Fig. 1, an automotive vehicle embodying the invention may comprise an internal combustion engine 10 having a spark ignition system, road wheels 12, a driving system providing a two-way driving connection between the engine and the road wheels whereby the engine may propel the vehicle, said driving system including a normally engaged clutch 14 and a transmission 16 which is adapted to be arranged to provide a forward or reverse drive of the vehicle, the ignition system indicated diagrammatically at 18 including a circuit having a normally closed switch indicated generally at 20.

The engine is provided with a fuel induction system which includes a fuel feeding device in the form of a carburetor 24 having a fuel jet or nozzle 26 arranged in the main air passage 28 leading to the intake manifold 22 of the induction system. The carburetor includes a normally closed throttle 32 which controls the flow of fuel and air to the engine through the induction system, the throttle being arranged so as to be operated by a suitable throttle control means, such as the accelerator pedal 34. The air which flows through the carburetor preferably is drawn in through the usual air intake filter indicated generally at 36.

The clutch 14 is normally engaged so that when the transmission is arranged to provide a forward or a reverse drive of the vehicle, the engine 10 will drive the wheels 12 thereby to propel the vehicle. The usual clutch pedal 38 is provided for disengaging the clutch, and in addition there is provided for disengaging the clutch a motor comprising a vacuum operated device 40 which is operatively connected with the clutch pedal 38.

The vacuum operated device 40 comprises a vacuum cylinder and piston which is connected with the intake manifold 22 and the clutch disengaging pedal 38 and is constructed and arranged so as to disengage the clutch when the throttle is closed during engine operation. The vacuum operated device 40 forms a means for disengaging the clutch automatically.

The device 40 has operatively associated therewith a lockout indicated generally at 42 which is operable for holding the clutch disengaged. The lockout 42 includes a toggle mechanism comprising link 43 and bell crank 44, the link 43 being pivotally connected to one arm of the bell crank 44 and to a bracket on one side of the piston 46 of the vacuum operated device 40. The bell crank 44 is pivoted at 48 and the other arm 50 of the bell crank is connected through a pin and slot connection 52 to the core 54 of a solenoid 56. The solenoid is electrically arranged in a circuit which includes a vehicle speed responsive switch indicated at 58, a transmission position control switch indicated at 60, and a throttle switch indicated at 62, said switches and the solenoid being arranged in series.

The vehicle speed responsive switch 58 is normally open; that is, it is of the type which is biased to open position. A centrifugal governor indicated generally at 64 is constructed and arranged to close the switch 58 when the speed of the vehicle is above a predetermined rate, say for example eight miles per hour, and to permit the switch 58 to open when the speed falls below such rate. The governor 64 may be driven by a flexible shaft 66 from a part of the transmission 16 which is connected to the road wheels 12 through the propeller shaft 68.

The transmission position control switch 60 is also normally open and is arranged to be closed when the transmission is set for driving the vehicle forwardly. More specifically, the shift lever 70 of the transmission, when the transmission is set in high gear as illustrated, engages a lever 72 which acts on the movable contact 74 of the switch 60 so as to close the contacts of the switch 60.

The transmission 16 may be of the conventional type having one reverse speed, a neutral position, and a low, second and high speed position, or may, of course, be of any desired type other than that illustrated, such as an automatic transmission, which will provide for a forward drive of the vehicle. The H-shaped diagram appearing immediately above the shift lever 70 diagrammatically illustrates the five positions in which the transmission may be arranged and shows the arrangement by which the shift lever 70 closes the switch 60 when the transmission is set in high gear for driving the vehicle forwardly. When the shift lever 70 is shifted out of high gear the contacts of the switch 60 will open.

The throttle switch 62, like the speed responsive switch 58 and the transmission position control switch 60, is also of the normally open type, that is, biased to open position. The throttle switch includes a movable contact 76 which is arranged to be moved into engagement with the other contact of the switch 62 in response to movement of the throttle 32 into its closed position. The movable contact 76 may be engaged by the accelerator pedal 34 and moved into engagement with the other contact of switch 62 when the pedal 34 is moved to its released position, as illustrated, or the switch 62 may be otherwise connected to throttle 32 or a means movable therewith so as to be opened and closed in response to opening and closing movement of throttle 32. The accelerator pedal 34 is pivoted at 78, and upon movement in a counterclockwise direction about its pivot will open the throttle 32 and open the switch 62. The closing of the speed responsive switch 58, the throttle switch 62 and the transmission position control switch 60 will energize the lockout circuit and the solenoid 56, whereupon the core 54 of the solenoid will react on the end of the arm 50 of the bell crank 44 to energize the lockout device 42, so as to hold the clutch 14 disengaged.

The lockout circuit as shown in Fig. 1 is energized and may be traced from the car battery 80 through the conventional lock controlled ignition switch 82, conductor 84, switch 58, conductor 86, switch 60, conductor 88, switch 62, conductor 90, switch 92, conductor 94, and through the windings of solenoid 56 to ground. As the switches 58, 60, 62 and 92 are in series, the opening of any one of these switches will open the lockout circuit just described and thereby render the lockout 42 inoperative.

A spring 96 connected to the slotted end of the core 54 of the solenoid 56 biases the core 54 to the left and when the solenoid is deenergized will break the toggle of the lockout device 42 and permit the piston 46 to shift to the right so as to release the clutch pedal and engage the clutch.

The arm 50 of the bell crank 44 is shown as extending through a slot in the wall of the cylinder in which the piston 46 operates. A suitable seal would necessarily have to be provided between the arm 50 and the cylinder wall around the slot, or the lockout device 42 could be mounted exteriorly of the cylinder and connected to the rod 98 which connects the piston 46 with the clutch pedal 38.

The ignition system includes the battery 80, the conventional lock controlled ignition switch 82, conductor 99, switch 20, coil 100, and the usual devices for providing a spark in the combustion chamber of the engine at the end of the compression stroke, such devices being indicated generally at 18.

The switch 20 is normally closed, that is, biased to closed position, and is arranged to be opened by the core 54 of the solenoid 56 upon energization of the solenoid. Since energization of the solenoid 56 is effected by the closing of the switches 60, 58, 62 and 92, and since the closing of the throttle 32 will effect the disengagement of the clutch, the switch 20 will be opened upon or in connection with the disengagement of the clutch whereby the ignition circuit will be deenergized which will kill the engine if transmission 16 is in high gear and the vehicle is moving at a speed above that at which switch 58 closes. Since the clutch 14 is disengaged, the wheels 12 are disconnected from the engine 10 and the vehicle may coast freely.

The vacuum operated device 40 includes the piston 46 which is reciprocally arranged in a cylinder 104. The cylinder on one side of the piston 46 is connected through a conduit 106 to the intake manifold 22 of the fuel induction system so that the vacuum existing in the manifold when the throttle 32 is closed will cause the piston 46 to move to the left and through the rod 98 and clutch pedal 38 effect the disengagement of the clutch. Opening of the throttle 32 will permit the clutch 14 to reengage. The vacuum operated device 40 thus will function when the engine is operating and the throttle is closed to disengage the clutch automatically and to permit the reengagement of the clutch when the throttle 32 is opened.

A slide valve 108 is operatively arranged in the conduit 106 between the intake manifold 22 and the cylinder 104 so that the clutch operating device 40 may be locked out. The valve 108 is shown in its open position and includes a slidable valve member 110 having a reduced portion which when arranged as shown permits communication between the interior of the cylinder 104 and the induction system of the engine. The valve member 110 is slidable to the left so as to move the reduced portion thereof out of alignment with the conduit 106 in order to shut off the communication between the cylinder 104 and the induction system 22 through the conduit 106, and to this end a manual control comprising a rod 112 is fixed to one end of the valve member 110. The rod 112 is connected by a spring 114 to a handle 116 so that the valve member may be manually shifted.

Offset portions 118 and 120 of the rod 112 and the handle 116 are engageable when the handle 116 is moved to the left so as to shift the valve 108 to its closed position. The spring 114 and the portions 118 and 120 provide a lost motion connection between the handle 116 and the valve 108 for a purpose which will be described hereinafter. The valve 108 is provided, however, so that the automatic clutch operating device 40 may be locked out, in which event the disengagement of the clutch may be effected by operation of the usual clutch pedal 38.

Another valve indicated generally at 122 is also arranged in the conduit 106 between the cylinder 104 and the induction system, and this valve 122 is controlled by the position of the accelerator pedal 34. The valve 122 includes a slidable valve member 124 slidably arranged in a valve cylinder 126, the valve member 124 having a reduced portion which when arranged as shown permits communication through the conduit 106 between the cylinder 104 and the intake manifold 22. The end of the valve cylinder 126 exposed to the face 128 of the valve member 124 is in communication by means of a passage 130 with the conduit 106 so that the vacuum in the intake manifold 22 will act on the valve member 124 and urge the same toward the left, thereby tending to close the valve 122 by shifting the valve member 124 to the left so that the reduced portion thereof is out of alignment with the conduit 106.

A link 132 pivotally connected at one end to the accelerator pedal 34 is provided with a hook 134 at its other end which is engageable with a shoulder 136 on the valve member 124 for shifting the valve member 124 to its open position when the throttle 32 is closed and the accelerator pedal 34 is in its closed position. The hook 134 and shoulder 136 provide a lost motion connection between the link 132 and the valve member 124 which permits the pedal 34 to move the throttle 32 to its open position without thereby shifting the valve member 124.

The valve member 124 is provided with a groove 138 which permits the flow of air from one end of a conduit 140, the other end of which communicates with the cylinder 104 on the right hand side of the piston 46. The groove 138 and conduit 140 provide for the exhaust of air from the cylinder 104 so as to permit movement of the piston 46 to the right in order to permit the reengagement of the clutch 14. With the parts arranged as shown, the clutch 14 is disengaged and the throttle 32 is closed and the accelerator pedal 34 which controls the opening and closing of the throttle 32 is in its closed position. Movement of the pedal 34 to open the throttle 32 will permit the vacuum in the intake manifold communicating with the valve cylinder 126 through the passageway 130 to shift the valve member 124 to the left, thereby moving one end of the groove 138 in the valve member 124 into registry with one end of the conduit 140 which will permit the exhaust of air from one end of the cylinder 104 through the conduit 140 and the groove 138, the rate at which the air will be exhausted depending in part upon the extent of movement of the valve 124 to the left. The rate of exhaustion of the air from the cylinder 104 through the conduit 140 and the groove 138 will control the speed of reengagement of the clutch.

The restricted orifice 142 ports atmosphere to the cylinder 104 to permit reengagement of the clutch, the size of the orifice being sufficiently small so as not to dissipate the suction when applied to the cylinder 104 to disengage the clutch. In lieu of the restricted orifice 142 any means now conventionally used may be employed for this purpose.

In order further to control the speed of reengagement of the clutch 14 a valve indicated generally at 150 is arranged in the conduit 140, and this valve 150 is controlled by a solenoid 152. The solenoid 152 is in a circuit which includes conductor 154, rheostat arm 156 of rheostat 158, conductor 160, and switch 162. The switch 162 has in common with the switch 58 a movable contact 164, the arrangement being such that when the switch 58 is closed the switch 162 is open, and vice versa. The contact 164 of the switches 58 and 162 is biased into position to close the switch 162. Thus the switch 162 is closed at car speeds below the speed at which the governor 64 is set to operate.

The rheostat arm 156 is mounted on the engine 10 so as to move therewith, while the resistance part of the rheostat 158 is mounted on the frame 166 of the vehicle. The engine 10 is mounted on resilient mountings, one of which is shown at 168, such mountings permitting the engine to rock relative to the frame 166 so as to reduce the transmission of engine vibration to the frame of the vehicle. Such mountings 168 are quite common and are frequently referred to as flexible mountings for the engine.

The arrangement of the rheostat arm 156 is such, however, that when the starting load or torque on the engine is high the engine mountings 168 will permit the engine to rock sufficiently so as to adjust the rheostat or switch 158 to control the flow of current through the circuit of the solenoid 152. The arrangement is such that under excessive engine loads the rheostat or switch 158 will control the solenoid circuit 152 so as to energize the same in order to position the valve 150 in the conduit 140 so as to retard the escape of air from the cylinder 104 through the conduit 140 so as to retard the speed of engagement of the clutch 14. Under normal engine loads the rheostat 158 will not pass sufficient current to energize the solenoid 152 so that at such times reengagement of the clutch will not be retarded by the valve 150. The spring loaded check valve 170 will permit the bleeding of air into the cylinder 104 when the piston 46 moves to the left.

When the switch 20 in the ignition circuit opens and kills the engine, the throttle 32 will be closed. In order to prevent pumping of oil and fuel by the engine due to the suction in the cylinders thereof after the ignition circuit is opened and before the engine comes to rest, there is provided an air by-pass around the carburetor and this consists of a conduit 174 and a by-pass valve 176. The conduit 174 extends between the air intake filter 36 and the intake manifold and around the carburetor 24, and the valve 176 is arranged to close the by-pass conduit 174 when the ignition circuit of the engine is closed. The valve 176 is closed by a solenoid 178 which is energized whenever the ignition circuit is closed.

The solenoid circuit includes the conductor 180 which extends from one side of the coil of the solenoid 178 to the ignition circuit on the ground side of the switch 20 so that when the switch 20 opens the solenoid 178 will be deenergized and the difference in pressure on the opposite sides of the valve 176 will force the same open, thereby permitting the flow of air into the induction system around the carburetor. As soon as the ignition circuit is reclosed by the closing of the switch 20, the solenoid 178 will close the valve 176 if the lock controlled switch 82 is closed.

From the foregoing it will therefore be evident that when the vehicle is being engine driven forwardly in high gear at speeds above that at which the governor 64 opens the switch 58, the closing of the throttle 32 by releasing the accelerator pedal 34 will effect the disengagement of the clutch 14 and the killing of the engine, thereby permitting the vehicle to coast freely.

If it is desired to discontinue the coasting and to engine drive the vehicle, opening of the throttle 32 by depressing the accelerator 34 will effect the reengagement of the clutch 14 and the energization of the ignition system, whereupon the rotation of the road wheels 12 will through the driving system crank the engine.

If while coasting the vehicle speed drops below the speed at which the governor 64 is set to operate, the switch 58 will open and thereby effect the reengagement of the clutch 14, the energization of the ignition system, and the cranking of the engine through the drive system from the road wheels.

If the vehicle is brought to a stop by means of the braking system of the vehicle, it will be desirable to have the governor 64 open the switch 58 at a higher than normal speed since the clutch must be engaged in order to start the engine, and engine operation is relied upon to effect the disengagement of the clutch 14 before the vehicle comes to a stop. In order to adjust the vehicle speed at which the governor 64 will operate when the vehicle is braked to a stop or to speeds below the responsive speed of the governor, a weight 190 pivotally mounted at 192 is provided with an arm 194 that reacts on an annular flange 196 on the governor. The flange 196 engages the movable contact 164 of the switches 58 and 162, and upon braking of the vehicle the inerita of the weight 190 will cause the arm 194 to move downwardly and move the flange 196 downwardly thereby permitting the switch contact 164 to move so as to open the switch 58 and to close the switch 162. A stop 198 limits the clockwise rotation of the inertia weight 190 about the pivot 192.

The braking system of the vehicle, which may be of any conventional type, is adapted to be actuated by a conventional brake pedal 200. In order to provide engine braking of the vehicle when the braking system is applied by the brake pedal 200, a link 202 pivoted at one end to the brake pedal 200 is engageable with a shoulder 204 on the rod 112 of the control for locking out the automatic clutch. The brake pedal 200 is pivoted at 201 and when the brake pedal 200 is applied it will rotate counterclockwise about the pivot 201 and through the links 202 and 112 shift the valve member 110 so as to close the valve 108 and thereby close the communication through the conduit 106 between the cylinder 104 and the intake manifold 22. In this way the automatic clutch operation will be locked out with clutch 14 in its engaged position and engine braking may be obtained along with braking by the usual brake system under the control of the brake pedal 200.

The valve member 110 of the valve 108 upon closing of the valve 108 is arranged to engage the movable contact 206 of the switch 92 so as to open the lockout circuit so as to neutralize the clutch lockout 42. When the brake pedal 200 is released, the switch 92 will close as it is a normally closed switch, the contact 206 thereof being biased to its closed position. The spring 114 between the control handle 116 and the link 112 permits the brake pedal 200 to operate the valve 108 and the switch 92 without disturbing the setting of the handle control 116, and when the brake pedal is released the spring 114 will restore the valve 108 and the switch 92 to their positions as illustrated.

The control handle 116 may also be moved to the left so as to engage the offset portions 118 and 120 and thereby manually lock out the automatic clutch operating device 40 and open the lockout circuit by opening the switch 92. The handle 116 thus may be set so as to lock out the automatic clutch operating device 40 and to maintain the switch 92 in its open position. However, as shown, the handle 116 is set so that the automatic clutch operating device 40 is operable when the switch 92 is closed. When the valve 108 is closed and the switch 92 is opened, whether by means of the control 116 or the brake pedal 200, the clutch 14 will be engaged and if the vehicle is coasting engine braking will be obtained.

If the brake pedal 200 is maintained depressed so as to maintain the brakes applied until the vehicle stops, the link 202 should be disengaged from the link 112 so that the automatic clutch operating device 40 may disengage the clutch 14 before the vehicle stops, and to this end a solenoid 210 is arranged to act on the link 202 so as to disengage the swinging end of the link 202 from the shoulder 204, the armature fastened to link 202 forming the core of the solenoid. A spring 212 biases the link 202 into position to engage the shoulder 204. The circuit of the solenoid 210 includes the conductor 214 and the switch 162 which is closed when the vehicle speed is below the speed at which the governor 64 is set to operate so that as soon as the switch 162 closes, the solenoid 210 will disconnect the brake pedal 200 from the link 112, thereby energizing the clutch operating device 40 which will operate in response to the suction in the intake manifold 22 to disengage the clutch before the vehicle is stopped by the application of the brakes under the control of the brake pedal 200.

In order to prevent the transmission from being shifted out of high gear when the vehicle is coasting without first restarting the engine, a latch 220 pivoted at 222 is arranged in the path of movement of the shift lever 70. The latch 220 is positioned as shown by a piston rod 224, and a spring 226 arranged in the cylinder 228 in which the piston 230 is arranged biases the piston 230 and the rod 224 so that the latch 220 will block the path of movement of the shift lever 70 if an attempt is made to shift the transmission out of high gear. The cylinder 228 is connected by a conduit 232 to the intake manifold so that suction in the intake manifold when the engine is operating will react on the piston 230 and thereby through the rod 224 shift the latch 220 out of the path of movement of the lever 70. There is sufficient clearance between the latch 220 and the lever 72 so as to permit the shift lever to move out of engagement with the lever 72, whereupon the switch 60 will open which will, as previously described, effect the reengagement of the clutch 14 and the starting of the engine. As soon as the engine starts the suction in the intake manifold will through the mechanism just described shift the latch 220 out of position as shown so that the shift lever 70 may be shifted out of high gear.

While the control device has been illustrated and described as being operable in response to operation of a speed responsive switch, a transmission position controlled switch, and a throttle controlled switch, it is to be understood that one or more of such controls, or their equivalents, might be eliminated, or might be employed independently of the other controls described. It is also to be understood that the specific form of each of the control mechanisms might be varied without departing from the basic concept of the present invention. For example, the speed responsive control mechanism need not be of the centrifugal governor type but may be of any other type, mechanical or electrical, suitable for performing the intended function. Similarly, the controls responsive to throttle, transmission, braking, etc. operation may be varied and their equivalents employed, as will be recognized by those skilled in the art.

In the modification illustrated in Fig. 2 the construction illustrated in Fig. 1 is modified to the extent that the governor 64 is dispensed with and the switch 258, corresponding in function with the switch 58, is controlled by a solenoid 260 which is in series with the generator 262 of the vehicle. The generator in this instance is connected to be driven from one of the road wheels 12 of the vehicle and is otherwise connected to the ignition system for the engine and the battery in the conventional manner.

The movable contact 364 of the switch 258 is connected by conductor 84 to the battery through the lock controlled ignition switch 82 while the stationary contact is connected by conductor 86 to the movable contact of the transmission position control switch 60. The switch 258 is, as shown, a normally open switch and is a vehicle speed responsive switch. However, when the speed of the vehicle is above a predetermined rate, the generator will energize the solenoid 260 sufficiently to cause the core 261 thereof to move the movable contact 364 of the switch into position to close the switch 258. As the vehicle speed decreases below a predetermined speed, say for example eight miles per hour, the current supplied to the coil of the solenoid 260 will not be sufficient to energize the solenoid, whereupon the switch 258 will open and the switch 362 will close. The switch 362 is identical to the switch 162 and closes the circuit through the rheostat 158 for the purpose of controlling the reengagement of the clutch in accordance with the load on the engine. The switches 258 and 362 have an inertia weight 190 associated therewith in the same manner as the weight 190 is associated with the switches 58 and 162 so as to open the switch 258 and close the switch 362 in the event that the vehicle is decelerated by the braking system thereof at a speed above that at which the solenoid 260 is deenergized.

In the modification illustrated in Fig. 3 a very simple non-automatic arrangement is illustrated for killing the engine and disengaging the clutch. In this modification the clutch pedal 38 is adapted upon movement thereof beyond that required to disengage the clutch to engage a button 370. The button 370 is connected by link 372 and Bowden wire 374 to a valve 376 which controls the by-pass 378 between the induction system 380 and either the exhaust system or carburetor air intake 382 of an internal combustion engine.

A spring 371 biases the button 370 to a position so that the valve 376 closes the by-pass 378. However, upon depressing the clutch pedal 38 beyond the extent required to disengage the clutch, the pedal 38 will engage the button 370 and shift the valve 376 to its open position, thereby opening the by-pass 378. This will permit exhaust gas from the exhaust system to flow into the induction system and kill the engine, and the engine will remain killed as long as the clutch pedal 38 is maintained depressed. Under these circumstances the vehicle will coast freely with the engine dead. The engine may be started by releasing the clutch pedal which will effect the closing of the by-pass 378, and the reengagement of the clutch will crank the engine so that the vehicle may subsequently be power driven.

In the modification shown in Fig. 4, movement of the clutch pedal 38 beyond that required to disengage the clutch will open a switch 420 in the ignition circuit indicated generally at 422 and close a switch 423 which will close the ignition circuit 422 through a switch 424 to the battery 80. The switch 424 is normally open, that is, biased to open position, but is closed by a bellows 426. The bellows is connected to an engine driven oil pump 428, the pressure from which will maintain the switch 424 closed as long as the engine is operating above a predetermined rate. The clutch pedal 38 is adapted to engage the common contact 425 of the switches 420 and 423 and to shift the contact so as to open the switch 420 and to close the switch 423 when the pedal is depressed beyond that required to disengage the clutch.

The switch 420 is normally closed and switch 423 is normally open. Thus depression of the clutch pedal will close the ignition circuit 422 through the circuit which includes the engine oil pressure operated switch 424, and if the engine throttle is closed when the clutch pedal 38 is depressed, the oil pump 428 driven by the engine will when the engine slows down permit the switch 424 to open, thereby opening the ignition circuit and killing the engine. Release of the clutch pedal will reestablish the drive between the engine and the road wheels and close the switch 420 so as to energize the ignition circuit and permit the engine to be cranked from the road wheels through the drive system of the vehicle.

In the modification illustrated in Fig. 5, which is a modification of that illustrated in Fig. 4, the construction is the same except that in Fig. 5 the switch 523, which is equivalent to the switch 423, is connected through a resistance 525 to the generator 527. The usual generator cutout 530 is arranged between the battery 80 and the generator, and when the clutch pedal closes the switch 523 the ignition circuit 422 through the switch 420 is open and the ignition circuit is then connected directly to the generator. As the engine speed slows down, which will occur when the engine throttle is closed, the output of the generator will be insufficient to energize the ignition system 422 and hence the engine will die. In the case of the modifications illustrated in Figs. 4 and 5, it is assumed that the operator of the vehicle will close the throttle when the clutch 38 is disengaged, as there would be no point in keeping the engine throttle open if the engine were not driving the vehicle.

In the arrangement shown in Fig. 6, which is a modification of Fig. 1, the governor 64 is dispensed with. The switch marked 658 corresponds with the switch 58 and the switch marked 662 corresponds with the switch 162. The switch 658 is shown closed. The switch construction is such that either the switch 658 or the switch 662 must be closed. In this case the accelerator pedal 634 by engagement with one end of the switch operating member 635 has shifted the movable contact 664 so as to close the switch 658. The switch 658 will remain closed until opened by the brake pedal 600. Application of the brake pedal 600 will engage one end of the switch actuating member 635 to open the switch 658 and to close the switch 662 by shifting the movable contact 664. When the switch 658 and the other switches in series therewith are closed the lockout circuit is closed and the circuit through the rheostat 158 and solenoid 152 is open. When the brake pedal 600 is applied, the switch 662 is closed which closes the circuit through the rheostat 158 and the solenoid 152. The common switch contact 664 is connected by conductor 84 to the battery through the lock controlled ignition switch 82. The modification as shown in Fig. 6 is otherwise the same as that shown in Fig. 1.

In the modification illustrated in Fig. 7 the arrangement of the control device is such that release of the accelerator pedal so as to close the throttle will automatically provide for coasting with a dead engine, but a further manipulation of the accelerator pedal is required in order to disengage the clutch and permit free coasting of the vehicle with a dead engine. In this modification closing of the throttle will, when the vehicle is moving forwardly above a predetermined speed, energize a by-pass means indicated generally at 700 and operable for discontinuing operation of the engine under such conditions. The device further includes provisions for energizing the lockout circuit so as to hold the clutch disengaged upon movement of the accelerator pedal into another position thereof. Certain of the parts illustrated in Fig. 7 are the same as those illustrated in Fig. 1, and accordingly similar reference characters have been applied to such parts.

The by-pass device 700 is arranged to feed non-combustible gases into the manifold 22 for discontinuing firing of the engine. The device includes a conduit 702 opening into the intake manifold 22 and communicating with a vacuum and filter chamber 704. Conduit means 706 communicates at one end with the chamber 704 and at the other end thereof opens into the exhaust manifold 708. A conduit 710 communicates at one end with the air cleaner 36 and at the other end thereof opens into conduit 706. A control valve 712 normally closes the conduit 706, and upon opening movement of valve 712 a non-combustible gas will be fed into the intake manifold from conduit 710 or from the exhaust manifold 708, as will be more fully explained hereinafter.

A solenoid 714 is provided for opening valve 712 upon energization thereof so as to permit a non-combustible gas to be fed into the engine and thereby discontinuing operation of the engine. The solenoid 714 is arranged in a circuit which will be traced from the car battery 80, the transmission position controlled switch 60, a throttle switch 716, a speed responsive switch 718, a solenoid 714 and a single pole, double-throw switch 720 which is arranged to be closed only when the clutch is disengaged by the vacuum motor 40 or when the clutch is engaged and the lockout circuit is open.

The transmission position controlled switch 60 may be similar to the corresponding switch described in connection with Fig. 1. The throttle switch 716 is a single pole, double-throw, snap action switch, the contact arm 722 of which is adapted to be engaged by an adjustable set screw 724 suitably secured to the throttle control rod 726 upon closing movement of throttle 32 upon release of the accelerator pedal 728. The contact arm 722 is normally biased into engagement with contact 730 by a spring 732, but closing movement of the throttle moves contact arm 722 into engagement with the other contact 734 of switch 716 so as to close the same.

In this modification it is proposed to employ a battery charging generator 736 which is adapted to be driven by motion of the vehicle. The speed responsive switch 718 comprises a compound solenoid device 738 which is connected to the generator in such a way that the net pull on the armature 740 is in direct proportion to the speed of the generator and independent of the voltage or amperage of the output. The device further includes a generator cutout 739 and a generator field regulator 741. The speed responsive switch 718 includes a switch 742 which controls energization of the by-pass solenoid 714 and also the lockout 56, and a switch 744 which controls the lockout solenoid 56 only. Switch 742 is normally open but is arranged to be closed by arm 740 when the speed of the vehicle is above a predetermined rate, for example eight miles per hour.

It will be seen that closing of throttle 32 by releasing accelerator pedal 728 when the vehicle is traveling above eight miles per hour with the transmission switch 60 closed will energize the by-pass solenoid 714 so as to open control valve 712. The by-pass means 700 includes a chamber 746 to which is transmitted the suction existing in the intake manifold 22 through bleed orifice 748 during operation of the engine. The solenoid 714 is provided with an actuating valve stem 750 which is biased by spring 752 into engagement with a valve seat 754 for closing a passage 756 when the solenoid is deenergized. The solenoid projects through an opening in a wall 758 which defines one wall of the chamber 746. A flexible diaphragm 760 secured to control valve disc 712 defines a chamber 762 which is adapted to communicate with vacuum chamber 746 when valve 750 is moved away from its valve seat 754 against the force of spring 752 upon energization of solenoid 714.

The valve member 764 secured to a rod 766 normally closes the conduit 706 which communicates with exhaust manifold 708, and is biased so as to close conduit 706 by the spring 768. The valve member 764 is adapted to close either the exhaust conduit 706 or the fresh air conduit 710, one of such conduits being open when the other is closed. The control valve 712 is connected to rod 766 by a spring 770 so that when the by-pass solenoid is deenergized, valve 764 will be arranged to close conduit 706 thereby opening conduit 710, and valve 712 will be seated against the end 772 of conduit 706 for preventing the flow of non-combustible gases into the induction system. Energization of solenoid 714 will effect opening movement of valve stem 750, thereby opening passage 756 so as to transmit the vacuum which exists in chamber 746 to chamber 762, thereby moving control valve 712 into the position shown in Fig. 9 so as to provide a communication between the conduit 702 and the fresh air conduit 710. The spring 770 permits valve member 764 to remain seated so as to close exhaust conduit 706 momentarily after opening of valve 712 so that fresh air will be transmitted from conduit 710 into the induction system for a very short time upon energization of the solenoid. The feeding of fresh air into the induction system will clear the cylinders and exhaust manifold of burnt gases.

A dash-pot 774 is provided at the other end of rod 766 and is operable to cause a slight delay in the shifting of valve member 764 from its position closing the conduit 706 to the position shown in Fig. 7 in which valve member 764 closes fresh air conduit 710 and opens conduit 706 so that warm, non-combustible gases from the exhaust manifold will be fed into the induction system 22 through conduit 702, thereby killing the engine while at the same time providing air against which the pistons operate so as to prevent the pistons from pumping oil into the cylinders while the engine is decelerating after operation thereof has been discontinued.

A centrifugal separator indicated schematically at 776 may be provided for preventing the passage of foreign particles into the conduit 706 and into the induction system. A screen 778 is arranged in chamber 704 between conduit 702 and bleed orifice 748 to prevent any possibility of sparks from getting through the by-pass device into the intake manifold.

Release of accelerator pedal 728 is therefore operable to effect discontinuance of engine operation while at the same time providing for engine braking at speeds above a predetermined minimum speed. Opening of any one of the switches 60, 716, 742 and 720 will deenergize solenoid 714 and therefore permit control valve 712 to close, at which time the engine will fire since it remains connected through the drive system and road wheels.

Immediately upon closing of the by-pass 700 suction in the intake manifold will be transmitted through conduit 106 to the vacuum operated device 40 so as to disengage the clutch if the throttle remains closed. Thus, if the throttle is closed and the vehicle is coasting with a dead engine and the speed of the vehicle falls below eight miles per hour, the switch 742 will open thereby starting the engine and then disengaging the clutch before the engine stalls. If throttle 32 is opened while the vehicle is coasting with a dead engine, as previously described, the by-pass will be closed thereby starting the engine. Vacuum in the intake manifold will not be transmitted to the vacuum operated device to disengage the clutch at such time since conduit 106 will be closed by valve 122 as described in connection with the device disclosed in Fig. 1.

When it is desired to obtain coasting with a dead engine and with the clutch disengaged, the accelerator pedal 728 may be manipulated into another position thereof to energize the lockout circuit and effect disengagement of the clutch. The lockout circuit in this modification includes the transmission switch 60, throttle switch 716, speed responsive switch 742, speed responsive switch 744, an accelerator pedal position controlled switch 780, solenoid 56, and switch 92. Switch 780 is normally open and is adapted to be closed upon swiveling movement of accelerator pedal 728 when the pedal is in its released position. A flange 782 may be provided on the accelerator pedal so as to facilitate swiveling movement thereof, and an arm 784 provided on a swivel mounting 786 is arranged to engage the arm 788 of the switch 780 upon swiveling movement of the pedal 728 so as to close switch 780.

Energization of the lockout circuit will energize solenoid 56 so as to move the core 54 thereof toward the position shown in Fig. 7. Contact arm 790 of switch 720 is normally biased into engagement with contact 792 by a spring 794, and switch 720 is closed by the engagement of arm 790 with contact 792 when the lockout circuit is deenergized, thereby permitting the by-pass solenoid circuit to be energized without energization of the lockout circuit.

As soon as solenoid 56 is energized, the core 54 thereof will engage switch arm 790 so as to open switch 720 thereby deenergizing the by-pass solenoid and reestablishing the engine vacuum and the transmission thereof to the vacuum operated device 40 through conduit 106 for disengaging the clutch. Switch 720 may be arranged so that a considerable travel of arm 790 is required before the arm will engage contact 796 after the clutch is fully disengaged and locked out by the lockout 42. As soon as switch arm 720 engages contact 796 the by-pass solenoid will again be energized for feeding non-combustible gases into the intake manifold thereby discontinuing operation of the engine.

Switch 744 is arranged to be closed only within a predetermined speed range which may be from eight to fifty-five miles per hour, although any other suitable speed range may be selected. The arrangement of the switch 718 is such that arm 740 will close switch 742 at all speeds above the predetermined minimum of eight miles per hour, and at speeds above a predetermined maximum, such as fifty-five miles per hour, arm 740 will move downwardly so as to maintain switch 742 closed but opening switch 744. The lockout circuit therefore can only be energized within the predetermined speed range so as to provide a safety factor, since free coasting of the vehicle at high speeds might be considered undesirable. If the vehicle is coasting freely with a dead engine and the speed thereof drops below the predetermined minimum, the lockout solenoid will be deenergized by the opening of switch 742, thereby permitting the clutch to reengage. The by-pass solenoid circuit will also be deenergized at this time, and as soon as the clutch is reengaged the engine will be cranked through the drive system and road wheels so as to start the same. If the throttle is maintained closed at such time, vacuum in the induction system will be transmitted to the vacuum operated device 40 for disengaging the clutch before the engine stalls.

An inertia responsive means, such as a pivoted weight 795, may be provided for affecting the speeds at which the various speed responsive switches will operate in the event of rapid deceleration of the vehicle such as would occur upon application of the brakes. The weight 795 may be arranged to influence the spring 797 which biases the speed sensitive arm 740 so as to open switch 742. It is contemplated that during violent or rapid deceleration of the vehicle the weight 795 will affect the speed sensitive arm 740 so as to effect opening of switch 742 at higher speeds than those at which the switch would normally open. It is pointed out that in this modification there is no necessity of any provisions for closing control valve 108 by means of a link 202 upon application of the brakes as described in connection with Fig. 1, since the accelerator pedal will be released whenever the operator desires to actuate the brakes and the lockout circuit will at such time not be energized, thereby automatically reengaging the clutch and obtaining engine braking and starting of the engine as previously described.

An accelerator pump indicated generally at 798 is provided and is operable under certain operating conditions of the vehicle to feed fuel through the fuel nozzle 26. The accelerator pump 798 may comprise a piston 800 having an orifice therein so as to prevent discharge of fuel by the pump unless the motion of piston 800 is rapid. A conduit 802 is adapted to communicate at one end with the induction system below the throttle 32 and at the other end thereof is provided with a slidable piston 804 connected to piston 800 by a rod 806. A spring 808 biases the pistons 804 and 800 downwardly, and manifold vacuum may be transmitted to piston 804 through conduit 802 so as to move piston 800 against the force of spring 808 whenever conduit 802 is open and the engine is operating under certain conditions.

A valve member 810 normally closes conduit 802 and is arranged to be actuated for opening conduit 802 upon energization of a solenoid 812 which is arranged in a circuit including switch 716 and speed responsive switch 814.

Switch 814 is normally closed but is arranged to be opened at vehicle speeds above eight miles per hour so that the accelerator pump 798 cannot be actuated at said vehicle speeds in excess of said predetermined minimum speed. As previously explained, switch arm 722 normally engages contact 730 which is arranged in the circuit containing solenoid 812, but closing of the throttle 32 effects opening of the circuit through accelerator pump solenoid 812. Therefore, the accelerator pump may be actuated only at such times as the vehicle speed is below a selected speed and the throtle is opened.

A suitable ignition switch 816 may be provided so that all of the above described circuits will be opened and the related mechanisms deenergized when the ignition is turned off.

As in the form of the invention shown in Fig. 1, it is contemplated that one or more of the various controls illustrated in Fig. 7 might be eliminated or employed independently of the other controls shown, and that either mechanical or electrical control means, or a combination thereof, may be employed, rather than the specific forms illustrated.

In Fig. 8 there is disclosed a modified form of accelerator pedal control arrangement in which the accelerator pedal is not swiveled to effect closing of the lockout circuit but is merely depressed slightly from its fully released position. In this modification a resilient connection is provided between the throttle control rod 826 and the accelerator pedal 828 by means of a spring 830. Rod 826 and arm 832 which is pivotally connected to the pedal 828 are provided with lugs 834 and 836 respectively. The arrangement is such that when the accelerator pedal is released, the lugs 834 and 836 will separate slightly thereby opening the contacts of switch 880 which corresponds to the switch 780 of Fig. 7, which must occur after switch 716 has been actuated to make contact with 734. By slightly depressing the pedal 828 against the resilient connection provided by spring 830 the lug 836 may be moved so as to close the contacts of switch 880. A suitable detent arrangement may be provided to enable the operator to determine the position of the pedal which will effect closing of switch 880. The resilient connection between rod 826 and arm 832 may be such as to permit the movement of arm 832 necessary to effect closing of switch 880 without moving rod 826, thereby maintaining the throttle closed. To prevent the lockout solenoid from operating when the throttle passes through the detent position from accelerate to complete release or vice versa, it is desirable to provide a shading coil winding 838 around the lockout solenoid 56 to delay momentarily the building up or waning of the flux.

The clutch instead of being a normally engaged type as shown may be of the type in which the clutch is normally disengaged but in which means are provided for holding the clutch engaged when the engine is operating or when the vehicle is moving.

The invention may also be used in a vehicle having an automatic transmission, rather than in a manually controlled transmission and clutch as shown in the previous modifications. In Fig. 10 there is disclosed a control means suitable for use in an automobile provided with an automatic stepped transmission, such as the transmission manufactured by General Motors and commonly referred to as the "Hydra-Matic" transmission. While in Fig. 10 the invention is disclosed as used in a vehicle provided with a "Hydra-Matic" transmission, it will be apparent that the invention might be applied to a vehicle equipped with a different type of automatic transmission without departing from the principles thereof.

The "Hydra-Matic" transmission is a variable speed transmission and comprises in general a fluid coupling and a front and rear planetary unit connecting the engine with the drive wheels of the vehicle. Two different forward speed ratios are available in each of the planetary units so that four forward speeds are available from the two planetary units. Each unit may be arranged to provide a direct drive or to provide a reduction ratio of a desired value. Since the construction and operation of this type of transmission is well known and understood by those skilled in the art, there is illustrated in Fig. 10 only so much of the transmission and the hydraulic controls therefor as is necessary for a complete understanding of the principles of this invention and the operation of the structure embodying such principles. It is believed sufficient for the purposes of an understanding of this invention to state that the power flow through the transmission is from the engine to the front planetary unit, then through the fluid coupling, and then through the rear planetary unit to the output shaft which is connected to the drive wheels in the usual manner. Since this invention contemplates a means for breaking the driving connection between the engine and road wheels under certain operating conditions, and since in the present instance this is accomplished by interrupting the power flow through the rear planetary unit, only part of the transmission, namely the rear unit, has been shown in Fig. 10. Certain of the hydraulic control means of a standard "Hydra-Matic" transmission, such as the governor, the rear pump, and the throttle valve, have also been illustrated.

The various speed ratios which are obtained in the planetary units of the transmission are automatically effected by certain hydraulic controls, as is well known, the speed at which the various ratios are established depending upon vehicle speed and the position of the accelerator pedal. When the transmission is in fourth speed, which is the transmission setting for normal driving conditions, the rear planetary unit is arranged in direct drive. The principles of this invention may be applied to a vehicle equipped with a transmission of this type with only slight modification of the existing or conventional controls therefor and with the addition of certain other controls to be described hereinafter.

Referring more particularly to the structure disclosed in Fig. 10, the numeral 900 indicates a fragmentary sectional view of the rear planetary unit of the transmission. The hydraulic governor indicated at 902 and the pump 904 are identical with those now used on the Hydra-Matic transmission, and no modification of these parts is necessary. The device further includes a throttle responsive valve 906, and a by-pass device 908 operable for discontinuing operation of the engine.

The drive shaft 910 is connected to and is driven with the driven torus of the hydraulic coupling of the transmission. The sun gear 911 of the rear unit 900 is splined on to shaft 910. The output shaft 912 of the transmission is integral with the planet pinion carrier 913 and planet pinions 914 are rotatably carried by the planet carrier 913 by means of pins 915. The internal gear 916 is integral with or carried by the drum 917. A sleeve 918 which is connected to and adapted to rotate with the planet carrier of the front unit surrounds shaft 910 and has its outer end arranged within drum 917. A multiple disc friction type clutch 919 is provided for locking sleeve 918 to drum 917 and comprises clutch drive plates 920 mounted on the end of sleeve 918 and driven plates 921 alternating with clutch plates 920. A clutch piston 922 is adapted when actuated by fluid pressure to clutch sleeve 918 to drum 917. The clutch 919 is a normally released clutch, and springs 923 reacting on the drum 917 and piston 922 are provided for disengaging the clutch.

The clutch 919 is adapted to be engaged by hydraulic pressure from line 924 reacting on piston 922 so as to move the same to the right against the force of springs 923. Since both shaft 910 and sleeve 918 rotate in the same direction and at the same speed, engagement of clutch 919 will in effect lock the ring gear 916 to the sun gear 911 so that the planet carrier 913 will be driven with shaft 910 and at the same speed, thereby providing a direct drive through the rear unit 900.

A friction band 925 is adapted upon actuation thereof to hold drum 917 and internal gear 916 against rotation so that when sun gear 911 is rotated at such time pinions 914 rotate about their pins and walk around inside of internal gear 916, carrying the planet carrier with them in the same direction of rotation as gear 911 but at a reduced speed. Band 925 is applied when the transmission is in both first and second speeds and is released in third and fourth speeds. Clutch 919 is disengaged in first and second speeds and is engaged in third and fourth speeds.

The clutch and the friction band of both the front and rear planetary units are controlled by hydraulic pressures. The application of fluid pressure to the bands and clutches effects the various speed changes of the transmission, and in order that the shift may occur at varying speeds the throttle responsive valve 906 is provided. The throttle responsive valve is connected through suitable linkage to the accelerator pedal and regulates the oil pressure in accordance with throttle opening. This pressure is called "throttle pressure" and works against the governor pressure and spring pressure of other control valves, not shown, so that higher vehicle speeds and higher governor pressure are required to accomplish the successive shifts, the vehicle speed and governor pressure required for each shift depending upon the throttle pressure as determined by the position of the throttle responsive valve.

The pump 904 receives oil from a supply line 926 and delivers oil under pressure through outlet 927. This pump pressure is delivered through conduits 928 and 929 to the rear unit 900 to effect engagement of clutch 919 under certain conditions, it being understood that additional controls, not shown, are conventionally employed and arranged in conduit 928 so that pressure sufficient to engage clutch 919 will be delivered through conduit 928 to valve 930 only when predetermined governor and throttle pressures exist, as determined by such additional controls.

Oil under pressure from the pump 904 is also delivered through conduit 931 to passage 932 which communicates with the interior of throttle responsive valve 906 and to passage 933 which also communicates with the interior of the throttle valve 906. The throttle responsive valve 906 as shown in Fig. 10 may be identical with the standard throttle responsive valve employed in the transmission, with the exception of the addition of passages 934 and 935 and the addition of passage 933. The valve comprises a valve body 936 having valve members 937 and 938 slidably arranged therein with a spring 939 therebetween and regulating the relative movement between the valve members 937 and 938 in response to depression of accelerator pedal 940, which is connected through link 941 to a lever 942 pivoted at 943, the lever 942 reacting against the end of valve member 938. The throttle pressure is delivered through passage 944 and is regulated in accordance with the position of the accelerator pedal so as to vary the speeds at which the governor and pump pressures will be effective to cause the various shifts of the transmission.

The centrifugal hydraulic governor 902 is supplied with oil from pump 904 through conduit 945 and delivers oil at pressures regulated according to the speed of the vehicle through conduits 946 and 947. The construction of the governor is such that pressure in line 946 is determined by the position of the relatively heavy weight 948 which is responsive to centrifugal force developed upon rotation of the governor mechanism, while pressure in line 947 is developed in response to the movement of a relatively light weight under the action of centrifugal force. The difference in the two weights which control valves within the governor is such that pressure in line 946 will develop rapidly in response to increased speed and is effective to produce gear changes at lower speeds, while the pressure in line 947 rises slowly with speed and attains its maximum value at a relatively high speed. The lines 946 and 947 are of course connected to certain other control valves which form no part of the present invention and which operate to effect the various speed changes.

The by-pass means 908 for discontinuing operation of the engine may comprise a chamber 949 adapted to be supplied with fresh air from filter 36 through conduit 950 and also adapted to be supplied with exhaust gases from exhaust manifold 708 through pipe 951 which communicates with chamber 949 and with the exhaust manifold, the centrifugal separator 776 being provided to prevent the passage of foreign particles into pipe 951. A conduit 952 communicates with chamber 949 at its lower end and opens into intake manifold 22. A valve member 953 is arranged within conduit 952 and normally closes the same so as to prevent the passage of gases from chamber 949 to the intake manifold 22. Valve 953 is secured to a lever 954 pivotally mounted relative to conduit 952. A valve 955 pivoted at 956 is adapted to pivot between the solid line position shown in which it seals fresh air conduit 950 from conduit 952, and the dotted line position thereof in which it seals the exhaust manifold from conduit 952.

A lever arm 957 pivots with valve 955, and a spring 958 is connected to lever 954 and lever 957. A rod 959 is pivotally connected at one end to lever 957 and has secured thereto a piston 960 moving within a chamber 961. A spring 962 biases rod 959 and piston 960 downwardly within chamber 961. Valve 955 is normally in the dotted line position thereof shown in Fig. 10 under the influence of spring 962, and lever 954 and valve 953 are normally maintained in a position such that valve 953 closes conduit 952. A pressure responsive bellows 963 reacts against the end of lever 954 and is adapted to pivot the same and valve 953 so as to open conduit 952 when pressure is supplied to the bellows 963 through line 964, as will be more fully described hereinafter.

As soon as valve 953 is opened in response to fluid pressure being transmitted to the bellows 963, fresh air from conduit 950 will flow through conduit 952 into intake manifold 22 and purge the engine and exhaust manifold of burnt exhaust gases. The chamber 961 and piston 960 form a dash pot which is operable to delay pivotal movement of lever 957 and valve 955 into the solid line position illustrated in the drawing for a short period of time after opening of valve 953. As soon as piston 960 moves through chamber 961 under the influence of spring 958, valve 955 will be in position to close the fresh air conduit 950 and open chamber 949 to the exhaust manifold through pipe 951, and thereafter air heated by the cylinders and exhaust manifold will be fed into the intake manifold 22 as long as valve 953 remains open.

It is contemplated that the control mechanism illustrated in Fig. 10 will be operable to effect operation of the by-pass means 908 whenever the vehicle is moving forwardly in fourth speed above a predetermined vehicle speed, such as 18 M. P. H. or some other suitable speed, and the accelerator pedal is moved to its fully released position. It is also contemplated that by an additional manipulation of the accelerator pedal from its released position the control arrangement will be operable to permit disengagement of clutch 919 to thereby break the drive between the engine and road wheels whenever the vehicle is traveling in fourth speed and within a predetermined speed range, such as from 18 to 55 or 60 M. P. H. The controls are such that the by-pass means will also discontinue operation of the engine when the accelerator pedal is manipulated to effect disengagement of clutch 919.

In accomplishing the above objects, control valves 965, 966, and 930 are added to the conventional hydraulic controls of the transmission. Valve 965 comprises a valve body 967 having a valve member 968 slidably arranged therein and biased toward the left by a spring 969. Line 946 from governor 902 communicates with the interior of valve body 967 and the pressure delivered through line 946 reacts against the left hand end of valve member 968 so as to move the same to the right into the position shown against the force of spring 969 when sufficient pressure is developed in line 946 by governor 902. Valve member 968 has a reduced portion 970 and passage 934 from the throttle valve 906 communicates with the interior of valve 965. Pressure from line 934 is transmitted through valve 965 to line 971 when valve member 968 is moved into its right hand position in response to a predetermined governor pressure developed in line 946.

Valve member 938 of the throttle valve 906 has an enlarged shoulder 972 which when the accelerator pedal is fully released is positioned in the dotted line position thereof shown at the right hand end of throttle valve body 936, in which position conduits 934 and 935 are both in communication with line 933 through the interior of throttle valve body 936. The valve member 938 is shown in the position thereof which effects operation of the control means to both discontinue engine operation and permit disengagement of clutch 919 so as to obtain dead engine coasting.

Control valve 966 comprises a valve body 973 having a valve member 974 slidably arranged at the left hand end thereof and a valve member 975 slidably arranged within the other end of valve body 973 and having its inner end 976 slidably and telescopically arranged within the inner end of valve member 974. A spring 977 is confined between opposing recesses formed in valve members 974 and 975 and tends to bias said valve members away from each other.

Valve member 975 and valve body 973 are provided with a central passage 978 adapted to receive a conduit 979 which communicates with passage 971 leading from valve 965. Valve member 975 is slidably disposed about conduit 979 and is provided with a transverse passage 980, into which passage conduit 979 is adapted to transmit fluid under pressure from line 971 when valve members 974 and 975 are in the relative positions shown. Valve 974 has a radial port 981 therein adapted to be aligned with transverse passage 980 in valve 975, and passage 982 leading from valve body 973 is adapted to convey pressure from conduit 979 and through passages 980 and 981 to cylinder 983 formed in valve 930.

Valve 930 comprises a valve body 984 defining cylinder 983 and having a valve member 985 slidably arranged therein and biased toward the left by a spring 986 into a position in which the enlarged head of valve 985 does not close the end of conduit 928 which opens into the interior of valve body 984 so that pressure fluid from pump 904 may be transmitted through valve 930 to conduit 929 where such fluid may react against clutch piston 922 to engage clutch 919 and provide a direct drive through the rear planetary unit. Spring 986 biases valve member 985 to the left into its open position so as to permit fluid pressure to be transmitted through line 929 except at such times as fluid pressure is transmitted to cylinder 983 in valve 930 so as to move valve member 985 to the right into the position shown against spring 986 to shut off the communication between lines 928 and 929.

Line 964, which opens into the pressure responsive bellows 963, communicates with line 971 which leads from the interior of valve 965 so that when valve member 968 of valve 965 is in the position shown and the throttle responsive valve is arranged so that line 934 receives fluid under pressure from line 933, the bellows 963 will be expanded and lever 954 pivoted in a counterclockwise direction as shown to effect operation of the by-pass means for discontinuing operation of the engine.

The force of spring 969 which biases valve member 968 to the left into a position in which the valve member 968 closes off conduit 934 is such that the pressure developed in line 946 by governor 902 in response to vehicle movement will be sufficient to move valve member 968 to the right into the position shown whenever the vehicle speed is above a predetermined minimum, which for example may be 18 M. P. H. The speed at which the governor must operate in order to move valve member 968 to the right should be such that restarting of the engine may be readily accomplished by cranking the same through the drive connection between the engine and wheels at such speed.

If the vehicle is traveling forwardly at speeds above the predetermined minimum speed and the throttle is allowed to close, pressure fluid from line 933 will be transmitted through throttle valve body 936 to line 934. As long as the vehicle speed is above the predetermined minimum speed, governor pressure through line 946 will maintain valve member 968 in the position shown in which fluid pressure from line 934 is transmitted through valve 965 around the reduced portion 970 of valve member 968 and into the line 971. Fluid pressure will then be transmitted through line 964 to bellows 963 to effect operation of the engine operation discontinuing means 908, as previously described, the transmission being in direct drive at such time. It will be understood that other standard hydraulic controls of the Hydra-Matic transmission will effect the shift into fourth speed from lower speed ratios immediately upon release of the accelerator pedal.

The above described operation of valve 965 and the by-pass means 908 will take place whenever the accelerator pedal is released to an extent sufficient to uncover passage 934 and governor pressure is above a certain value. When the accelerator pedal is fully released so that the enlarged shoulder 972 of throttle valve member 938 is in the dotted line position thereof at the extreme right of throttle valve body 936, line 935 will be exposed to hydraulic pressure from line 933 and such pressure will be transmitted to the right hand end of valve member 975 of control valve 966. Transmission of pressure through line 935 to valve 966 will shift valve member 975 to the left against the force of spring 977, and such movement will displace transverse passage 980 in valve member 975 to the left relative to valve member 974 so that passage 980 is no longer in communication with passage 981 and line 982. The closing of port 981 will prevent the transmission of fluid pressure through valve 966 to chamber 983 in valve 930 so that valve member 985 will be maintained in its left hand position under the influence of spring 986, thereby permitting fluid pressure from line 928 to be transmitted to clutch piston 922 for effecting engagement of the clutch.

When the governor pressure in line 947 reaches a predetermined value, such as corresponds to a vehicle speed in the neighborhood of 55 M. P. H., valve member 974 will be shifted to the right against spring 977 and thereby shift port 981 out of registry with transverse passage 980 and line 982 so as to prevent the transmission of fluid pressure to the valve 930, thereby maintaining communication between lines 928 and 929 through valve 930.

Assuming the vehicle to be traveling in fourth speed above 18 M. P. H., full release of the accelerator pedal will effect transmission of fluid pressure from line 933 to line 934 and through control valve 965, since valve member 968 is at such time in its right hand position. Fluid pressure from the valve 965 will be conducted through lines 971 and 964 to the by-pass device for killing the engine, and such fluid pressure will also be communicated to the interior of conduit 979, but since fluid pressure is also transmitted through line 935 against the right hand end of valve member 975 at such time, valve member 975 will be shifted to the left, thereby closing line 982 and permitting the valve member 985 to remain in its left hand or open position thereby permitting the clutch to remain engaged.

If the vehicle speed drops below a predetermined minimum, the pressure in line 946 which is transmitted to the left hand end of valve member 968 will decrease to a point where spring 969 will shift valve member 968 to the left, thereby closing off the flow of pressure fluid to valve 966 from line 934. The by-pass device 908 will then be deenergized and valve 953 will return to its closed position and valve 955 will return to its normal position, shown in dotted lines in Fig. 10. Since the valve member 968 will be shifted to the left against the governor pressure developed in line 946 at a vehicle speed at which it is still possible to obtain satisfactory cranking of the engine through the drive system, the engine will at such time be cranked by the drive system and started.

In order to obtain free coasting with a dead engine, the accelerator pedal may be depressed a very slight amount to a notched position in which the enlarged portion 972 of throttle valve member 938 is arranged to close off line 935 from the pressure existing in line 933 while maintaining line 934 in communication with the pressure existing in line 933, as shown in the drawing. A suitable detent arrangement may be provided for enabling the operator to determine the notched or dwell position of the accelerator pedal necessary to effect free coasting with a dead engine, and such detent mechanism may include a ball 987 adapted to engage either one of a pair of detents 988 formed in lever 942 under the influence of spring 989.

If the vehicle is traveling above the predetermined minimum at which the control arrangement is set to operate and below the predetermined maximum speed above which valve member 974 will be shifted to the right in response to governor pressure in line 947 and the throttle is moved into the notched position thereof as shown in the drawing, fluid pressure from line 933 will be transmitted through line 934, valve 965, lines 971 and 964, to bellows 963 to effect operation of the by-pass means 908 as previously described, and such fluid pressure will also be transmitted through conduit 979 to transverse passage 980 in valve member 975 and through port 981 to passage 982 into chamber 983 to react against valve member 985 and shift the same to the right into the position shown so as to prevent the transmission of the fluid pressure which engages clutch 919 through line 929. Clutch 919 will then be released under the influence of clutch release springs 923 and planet pinions 914 will be free to rotate about their pins without imparting rotation to the planet carrier 913 and output shaft 912.

If the throttle is moved into its notched position at vehicle speeds above the predetermined safe coasting range, governor pressure through line 947 will have shifted valve member 974 to the right so as to close off line 982 and permit clutch 919 to remain engaged so that engine braking will continue to be obtained. With the throttle in the notched position and the vehicle coasting freely without engine braking, if the speed falls below the predetermined minimum valve member 968 will shift to the left and thereby stop the transmission of fluid pressure to both the by-pass device 908 and the valve 930 so as to reestablish the driving connection between the engine and drive wheels and permit the cranking of the engine through the drive system.

Opening movement of the throttle from either its fully released position or from its notched position will close off line 934 from fluid pressure and render the entire device inoperative, and the transmission will then operate in a conventional manner. The transmission will also operate in a conventional manner at all speeds other than fourth and at all vehicle speeds below the predetermined minimum at which cranking of the engine may be obtained.

A restriction 990 is provided in line 982 which leads into the interior of valve 930 for the purpose of preventing the instantaneous transmission of fluid pressure to valve 930 to shift valve member 985 into a position permitting disengagement of clutch 919 when the throttle valve member 938 is moved through its dwell position either upon opening or closing movement thereof.

The left hand end of valve member 968 is provided with a reduced portion 991 having transverse passages 992. The bore at the left hand end of valve body 967 is of reduced diameter and the reduced end 991 of valve member 968 is slidably received within the reduced bore 993 when the valve is in its left hand position. As soon as valve member 968 begins to move to the right in response to governor pressure, such pressure will be transmitted through passages 992 to the annular space surrounding the reduced end 991 of valve member 968 where such fluid pressure will react against shoulder 994 on valve member 968 formed by the reduced extension. This arrangement prevents hunting of the valve and causes the same to shift to the right at a higher speed than the valve shifts to the left. Valve member 974 of valve 966 is provided with passages 995 similar to passages 992 in valve member 968 so as to prevent hunting of valve member 974 when the governor pressure is at or near the value at which valve member 974 shifts to the right.

A manual control 996 may be connected to valve member 968 for locking the same in its left hand position in order to lock out the entire control means if desired. In order to obtain engine braking in the event that the vehicle is coasting freely with a dead engine and the wheel brakes are applied, a weight member 997 pivoted at 998 is arranged to engage rod 999 which is connected to valve member 975 for shifting the same to the left so as to close passage 982 in response to rapid deceleration of the vehicle.

In Fig. 11 there is disclosed a modified form of accelerator pedal control which might be used in conjunction with the structure shown in Fig. 10. In this modification release of the accelerator pedal will effect operation of the by-pass means 908 to discontinue operation of the engine as long as the vehicle speed is above the predetermined minimum. Swiveling movement of the accelerator pedal from its released position is necessary to effect disengaging of the clutch 919 to obtain dead engine coasting without engine braking.

In this modification the throttle responsive valve 1006 is provided with a passage 1007 which is adapted to communicate with line 933 when the accelerator pedal 940 is in its released position. The accelerator pedal is connected through linkage 1008 to a pivoted lever 1009 which reacts against the end of throttle valve member 938.

A valve 1010 having a piston 1011 slidably arranged therein is provided with an inlet 1012 communicating with line 1007. A spring 1013 confined between an enlarged head 1014 at one end of piston 1011 and an end wall of valve 1010 biases the piston 1011 into the position shown in Fig. 11. Piston 1011 is provided with an enlarged head 1015 at its other end and a stem 1016 projecting therefrom so as to be engaged by an arm 1017 provided on block 1018 swiveled by means of a pin 1019 and to which block the accelerator pedal 940 is pivotally connected.

When the accelerator pedal is in its released position, which is the position shown in Fig. 11, fluid pressure from line 1007 is transmitted through the interior of valve 1010 and discharged through lines 1020 and 1021. The line 1020 of Fig. 11 corresponds to the line 935 of Fig. 10, and line 1021 of Fig. 11 corresponds to line 934 of Fig. 10. It will therefore be seen that when the accelerator pedal is fully released and the vehicle traveling in fourth speed above the predetermined minimum, fluid pressure will be transmitted through lines 1020 and 1021. The remainder of the control arrangement of Fig. 11 is the same as that disclosed and described in Fig. 10, and it will be seen that in released position of the throttle, valve 965 will permit the transmission of fluid to the by-pass 908 so as to discontinue operation of the engine, while the fluid pressure in line 1021 will effect the shifting of valve member 957 to the left so as to prevent the transmission of fluid to the valve 930, thereby maintaining the clutch 919 in its engaged position.

The accelerator pedal may be provided with a blade 1022 at one edge thereof so as to permit swiveling movement of the accelerator pedal and its mounting block 1018 which will effect shifting of piston 1011 into a position in which enlarged head 1015 of the piston closes off passage 1020, which has the effect of closing off fluid pressure through line 935 of Fig. 10, thereby removing the fluid pressure reacting against the right hand end of valve member 975 and permitting the same to shift back to the right into the position shown in Fig. 10, at which time fluid pressure will be transmitted through line 982 to valve 930 to effect disengagement of the clutch, as previously described.

The operation of the modification of Fig. 11 is identical with that of Fig. 10 except that the accelerator pedal is swiveled slightly from its released position in order to obtain disengagement of the clutch instead of being moved into a notched position thereof, as in Fig. 10.

This application is a continuation-in-part of my prior copending application Serial No. 59,131, filed November 9, 1948, for "Automotive Vehicle Control," now abandoned.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. In an automotive vehicle having an engine, road wheels, a driving system providing a two-way driving connection between said engine and wheels whereby said engine may propel said vehicle, said driving system including a clutch and a transmission which is adapted to be arranged to provide a forward drive of the vehicle, a fuel induction system for said engine including a fuel feeding device having a normally closed throttle for controlling the flow of fuel to said engine through said induction system, means controlling the position of said throttle, means operable for disengaging said clutch, a lockout operable for holding said clutch disengaged, means for energizing said lockout including a vehicle speed responsive means, a transmission position controlled means, and a means controlled by the position of said throttle control means, said vehicle speed responsive means being constructed and arranged to be actuated when the speed of said vehicle is above a predetermined rate and inoperative below such speed, said transmission position controlled means being constructed and arranged to be actuated when the transmission is set for driving said vehicle forwardly, said throttle controlled means being constructed and arranged to be actuated when said throttle is closed, the actuation of said speed responsive means, said throttle controlled means and said transmission position controlled means energizing said lockout for holding said clutch disengaged, and means operable in connection with the disengagement of said clutch by said means for discontinuing operation of said engine, said transmission position controlled means, said throttle controlled means and said speed responsive means being constructed and arranged so that when any one of said means is inoperative said lockout will be deenergized whereby said clutch will reengage and render said means for discontinuing operation of said engine inoperative so as to permit the starting of said engine by said driving system and the road wheels.

2. Apparatus according to claim 1 wherein said transmission has a latch associated therewith operable to prevent changing the transmission setting from its forward drive position, said latch being rendered inoperative by engine operation.

3. Apparatus according to claim 1 wherein said induction system is provided with a by-pass around said throttle for admitting non-combustible gas to said induction system and means for opening said by-pass upon energization of said lockout.

4. Apparatus according to claim 1 wherein said vehicle speed responsive means has an inertia responsive mechanism associated therewith operable for temporarily changing the predetermined speed at which said speed responsive means will be rendered inoperative upon deceleration of said vehicle.

5. In an automotive vehicle having an internal combustion engine, a drive wheel, a driving system providing a driving connection between said engine and wheel whereby said engine may propel said vehicle, said driving system including a clutch, a fuel induction system for said engine including a fuel feeding device having a normally closed throttle for controlling the flow of fuel to said engine through said induction system, means controlling the position of said throttle, means operable for disengaging said clutch, a lockout device operable for holding said clutch disengaged, means operable for energizing said device and including a vehicle speed responsive means and a means controlled by the position of said throttle control means, said vehicle speed responsive means being constructed and arranged to be actuated when the speed of said vehicle is above a predetermined rate, said throttle controlled means being constructed and arranged to be actuated when said throttle is closed, the actuation of said speed responsive means and said throttle controlled means energizing said device so as to render said lockout device operable for holding said clutch disengaged, and means operable in connection with the disengagement of said clutch by said clutch disengaging means for discontinuing operation of said engine, said throttle controlled means and said speed responsive means being constructed and arranged so that de-actuation of either of said means will render said lockout device inoperative whereby said clutch will reengage and permit the starting of said engine by said driving system and said wheel.

6. In an automotive vehicle having an internal combustion engine, road wheels, a driving system providing a two-way driving connection between said engine and wheels whereby said engine may propel said vehicle, said driving system including a clutch, a fuel induction system for said engine including a fuel feeding device having a normally closed throttle for controlling the flow of fuel to said engine through said induction system, means controlling the position of said throttle, means operable for disengaging said clutch, a lockout operable for holding said clutch disengaged, means operable for energizing said lockout and including a means controlled by the position of said throttle control means, said throttle controlled means being constructed and arranged to be actuated when said throttle is closed, the actuation of said throttle controlled means energizing said lockout for holding said clutch disengaged, and means operable upon the disengagement of said clutch for discontinuing operation of said engine, said throttle controlled means being constructed and arranged so that de-actuation thereof will render said lockout inoperative whereby said clutch will reengage and permit the starting of said engine by said driving system and the road wheels.

7. In an automotive vehicle having an internal combustion engine, road wheels, a driving system providing a two-way driving connection between said engine and wheels whereby said engine may propel said vehicle, said driving system including a clutch and a transmission which is adapted to be arranged to provide a forward drive of the vehicle, an ignition system for said engine including a circuit having a normally closed switch therein, means operable for disengaging said clutch, a lockout operable for holding said clutch disengaged, means operable for energizing said lockout and including a transmission position controlled means, said transmission position controlled means being normally constructed and arranged to be actuated when the transmission is set for driving said vehicle forwardly, the actuation of said transmission position controlled means energizing said lockout for holding said clutch disengaged, and means operable upon the disengagement of said clutch for opening said switch in said ignition circuit, said transmission position controlled means being constructed and arranged so that the de-actuation of said means will render said lockout inoperative whereby said clutch will reengage and permit said switch in said ignition circuit to close and the starting of said engine by said driving system and the road wheels.

8. In an automotive vehicle having an internal combustion engine, road wheels, a driving system connected to said engine and wheels whereby said motor may propel said vehicle, said driving system including a clutch, a fuel induction system for said engine including a fuel feeding device having a throttle for controlling the flow of fuel to said engine through said induction system, means operable for disengaging said clutch, a lockout operable for holding said clutch disengaged, means operable for energizing said lockout and including a vehicle speed responsive means, said vehicle speed responsive means being normally deenergized and constructed and arranged to be energized when the speed of said vehicle is in a predetermined range, the energization of said speed responsive means energizing said lockout for holding said clutch disengaged, and means operable upon the disengagement of said clutch by said clutch disengaging means for discontinuing operation of said engine.

9. In an automotive vehicle having an internal combustion engine, road wheels, a two-way driving system connected to said engine and wheels whereby said engine may propel said vehicle, said driving system including a clutch and a transmission which is adapted to be arranged to provide a forward drive of the vehicle, a fuel induction system for said engine including a fuel feeding device having a normally closed throttle for controlling the flow of fuel to said engine through said induction system, means controlling the position of said throttle, means including a motor operated device operable for automatically disengaging said clutch when said throttle is closed, a lockout operable for holding said clutch disengaged, means controlled by the vehicle speed, the position of said throttle control means and the arrangement of said transmission for energizing said lockout so as to hold said clutch disengaged when the speed of said vehicle is above a predetermined rate and the transmission is set for driving said vehicle forwardly and said throttle is closed, and means operable upon energization of said lockout for discontinuing operation of said engine, said means controlled by the vehicle speed, the position of said throttle control means and the arrangement of said transmission de-energizing said lockout when the vehicle speed falls below a predetermined amount, or when said throttle is opened, or when the transmission setting is changed thereby to permit the reengagement of said clutch and the starting of said engine by said driving system and the road wheels.

10. In an automotive vehicle having an internal combustion engine, road wheels, a driving system connected to said engine and wheels whereby said engine may propel said vehicle, said driving system including a clutch and a transmission which is adapted to be arranged to drive the vehicle, a fuel induction system for said engine including a fuel feeding device having a normally closed throttle for controlling the flow of fuel to said engine through said induction system, means controlling the position of said throttle, means operable in response to engine operation for disengaging said clutch, means controlled by the vehicle speed, the position of said throttle control means and the arrangement of said transmission for maintaining said clutch disengaged when the speed of said vehicle is above a predetermined rate and the transmission is set for driving said vehicle and said throttle is closed, and means operable upon the disengagement of said clutch by said engine operation responsive means for discontinuing the operation of said engine, said means controlled by the vehicle speed, the position of said throttle control means and the arrangement of said transmission permitting the engagement of said clutch when the vehicle speed falls below a predetermined amount, or when said throttle is opened, or when the transmission setting is changed.

11. In an automotive vehicle having an internal combustion engine, road wheels, a driving system connected to said engine and wheels whereby said engine may propel said vehicle, said driving system including a clutch, a fuel induction system for said engine including a fuel feeding device having a normally closed throttle for controlling the flow of fuel to said engine through said induction system, means for controlling the position of said throttle, means operable for disengaging said clutch, and controlled by the position of said throttle control means for maintaining said clutch disengaged when said throttle is closed, and means also controlled by the position of said throttle control means and operable for discontinuing engine operation when said throttle is closed by said throttle control means, said clutch disengaging means and said engine operation discontinuing means being rendered inoperable when said throttle is opened by said throttle control means thereby to start said engine by said driving system and the road wheels.

12. In an automotive vehicle having an internal combustion engine, road wheels, a driving system connected to said engine and wheels whereby said engine may propel said vehicle, said driving system including a clutch and a transmission which is adapted to be arranged to provide a forward drive of the vehicle, a fuel induction system for said engine including a fuel feeding device having a normally closed throttle for controlling the flow of fuel to said engine through said induction system, a device operable for disengaging said clutch, means controlled by the arrangement of said transmission and operable when said clutch is disengaged by said device for maintaining said clutch disengaged when the transmission is set for driving said vehicle forwardly, and means operable upon the disengagement of said clutch by said device for discontinuing the operation of said engine, said means controlled by the arrangement of said transmission permitting the engagement of said clutch when the transmission setting is changed thereby to start said engine by said driving system and the road wheels.

13. In an automotive vehicle having an internal combustion engine, road wheels, a driving system connected to said engine and wheels whereby said engine may propel said vehicle, said driving system including a clutch, a fuel induction system for said engine including a fuel feeding device having a normally closed throttle for controlling the flow of fuel to said engine through said induction system, means controlled by the vehicle speed and operable for disengaging said clutch and maintaining said clutch disengaged when the speed of said vehicle is above a predetermined rate, and means operable concurrently with the disengagement of said clutch by said means, for discontinuing the operation of said engine, said means controlled by the vehicle speed permitting the engagement of said clutch when the vehicle speed falls below a predetermined amount in order to start said engine by said driving system and the road wheels.

14. In an automotive vehicle having an internal combustion engine with an ignition system, road wheels, a driving system providing a two-way driving connection between said engine and wheels whereby said engine may propel said vehicle during operation of said engine, said driving system including a clutch, an operator controlled means, means operable in response to positioning of said operator controlled means in one position thereof during forward movement of said vehicle for disengaging said clutch so as to break the driving connection between said engine and road wheels, means operable in response to positioning of said operator controlled means during forward movement of said vehicle for discontinuing operation of said engine, said clutch disengaging means and said engine operation discontinuing means being rendered inoperable in response to movement of said operator controlled means from said one position to another position thereof, response to movement of said operator controlled means from said one position to another position thereof whereby reengagement of said clutch while said vehicle continues to move in said direction will crank said engine for restarting the same, said means for discontinuing the operation of said engine including provisions operable to prevent said engine from pumping oil into the combustion chambers thereof when said engine is decelerating after the operation thereof has been discontinued.

15. An automotive vehicle according to claim 14 wherein said means for discontinuing the operation of said engine comprises a means for deenergizing said ignition system.

16. In an automotive vehicle having an internal combustion engine and fuel induction and exhaust systems, road wheels, a driving system providing a two-way driving connection between said engine and wheels whereby said engine may propel said vehicle during operation of said engine, said driving system including a clutch, a transmission which is adapted to be arranged to drive the vehicle, means operable during forward movement of said vehicle for disengaging said clutch so as to break the driving connection between said engine and road wheels, means for holding said clutch in its disengaged position, and means operable when said clutch is held in its disengaged position by said means for establishing communication between said induction and exhaust systems so as to discontinue the operation of said engine, said means for establishing communication between said induction and exhaust systems being constructed and arranged so as to be rendered inoperable upon reengagement of said clutch whereby reengagement of said clutch while said vehicle continues to move in said direction will crank said engine of said transmission is arranged in its drive position.

17. In an automotive vehicle having an internal combustion engine with a spark ignition system including a battery and a generator operable for charging said battery, road wheels, a driving system providing a two-way driving connection between said engine and wheels whereby said engine may propel said vehicle during operation of said engine, said driving system including a normally engaged clutch, a transmission which is adapted to be arranged to drive the vehicle, means operable during forward movement of said vehicle for disengaging said clutch so as to break the driving connection between said engine and road wheels, and means operable in connection with the disengagement of said clutch for shunting said battery out of said ignition circuit and connecting said ignition circuit directly to said generator so as to discontinue the operation of said engine, said means operable in connection with the disengagement of said clutch being constructed and arranged so as to be rendered inoperable upon reengagement of said clutch whereby reengagement of said clutch while said vehicle continues to move in said direction will crank said engine if said transmission is arranged in its drive position.

18. In an automotive vehicle having an engine with an ignition system and an engine speed responsive switch in said system, road wheels, a driving system providing a two-way driving connection between said engine and wheels whereby said engine may propel said vehicle during operation of said engine, said driving system including a normally engaged clutch, a transmission which is adapted to be arranged to drive the vehicle, means operable during forward movement of said vehicle for disengaging said clutch so as to break the driving connection between said engine and road wheels, and engine speed controlled means operable when said clutch is disengaged for opening said switch so as to discontinue the operation of said engine, said engine speed controlled means being constructed and arranged so as to be rendered inoperable upon reengagement of said clutch whereby reengagement of said clutch while said vehicle continues to move in said direction will crank said engine if said transmisson is arranged in its drive position.

19. In an automotive vehicle having an engine with a fuel induction system including a throttle operable for varying the feed of fuel to the engine in order to control the speed thereof, road wheels, a driving system providing a two-way driving connection between said engine and wheels whereby said engine may propel said vehicle during operation of said engine, said driving system including a clutch, control means operable during forward movement of the vehicle above a predetermined speed for disengaging said clutch so as to break the driving connection between said engine and road wheels and means operable during forward movement of the vehicle above a predetermined speed for discontinuing the operation of said engine while allowing the vehicle to coast freely, and means operable upon the opening of said throttle for effecting the reengagement of said clutch and the starting of said engine.

20. An automotive vehicle according to claim 19 wherein said vehicle is provided with a braking system including a device operable for actuating said braking system so as to decelerate the vehicle, and means operable upon operation of said device when the vehicle is coasting and the engine is dead for effecting the reengagement of said clutch and the starting of said engine.

21. In an automotive vehicle having an engine with a fuel induction system including a throttle operable for varying the feed of fuel to the engine in order to control the speed thereof, means controlling the position of said throttle, road wheels, a driving system providing a two-way driving connection between said engine and wheels whereby said engine may propel said vehicle during operation of said engine, said driving system including a clutch, means operable upon closing of said throttle by said throttle control means during forward driving movement of the vehicle for disengaging said clutch so as to break the driving connection between said engine and road wheels, means operable in connection with the disengagement of said clutch for discontinuing the operation of said engine while allowing the vehicle to coast freely, and means operable upon the opening of said throttle for effecting the reengagement of said clutch and the starting of said engine.

22. In an automotive vehicle having an engine with a fuel induction system including a throttle operable for varying the feed of fuel to the engine in order to control the speed thereof, a throttle control means, road wheels, a driving system providing a two-way driving connection between said engine and wheels whereby said engine may propel said vehicle during operation of said engine, said driving system including a clutch, means operable upon movement of said throttle control means into one position thereof during forward movement of the vehicle for disengaging said clutch so as to break the driving connection between said engine and road wheels and means operable upon movement of said throttle control means to said one position during forward movement of the vehicle for discontinuing the operation of said engine while allowing the vehicle to coast freely, and speed responsive means operable when the speed of the vehicle falls below a predetermined amount for effecting the reengagement of said clutch and the starting of said engine.

23. In an automotive vehicle having an engine with a fuel induction system including a throttle operable for varying the feed of fuel to the engine in order to control the speed thereof, a throttle control means, road wheels, a driving system providing a two-way driving connection between said engine and wheels whereby said engine may propel said vehicle during operation of said engine, means operable during forward movement of the vehicle upon movement of said throttle control means into one position thereof to break the driving connection between said engine and road wheels, means operable upon said movement of said throttle control means to discontinue the operation of said engine while allowing the vehicle to coast freely, and means operable upon the opening of said throttle by said throttle control means when said vehicle is coasting for starting said engine and re-establishing said driving connection.

24. An automotive vehicle control according to claim 14, wherein said engine includes a fuel induction system through which a combustible fuel mixture is supplied to the engine and wherein said provisions to prevent said engine from pumping oil into the combustion chambers thereof comprise a means for admitting noncombustible gas to said induction system.

25. An automotive vehicle control according to claim 14, wherein said provisions to prevent said engine from pumping oil comprise a means operable for continuing the operation of said engine during the deceleration thereof as long as the engine is operating above a predetermined rate.

26. In an automotive vehicle having an internal combustion engine and a throttle for controlling the flow of fuel to said engine for regulating the speed thereof, an operator controlled means, a driving wheel, a drive system affording a two-way driving connection between said engine and wheel whereby said engine may propel said vehicle, said drive system including a clutch which when disengaged breaks the driving connection between said engine and drive wheel, means operable during forward movement of the vehicle for discontinuing operation of the engine, and means operable during forward movement of the vehicle for effecting disengagement of said clutch, both said means being operable upon movement of said operator controlled means into one position thereof.

27. An automotive vehicle according to claim 26 including a means operable upon deceleration of said vehicle while coasting for disabling both said means so as to reengage said clutch and thereby crank said engine.

28. An automotive vehicle according to claim 26 wherein said means for discontinuing operation of said engine includes provisions operable to prevent said engine from pumping oil into the combustion chambers thereof when the engine is decelerating after the operation thereof has been discontinued by said means.

29. An automotive vehicle control according to claim 26 in which said vehicle includes braking mechanism and means for rendering both said means inoperative in response to actuation of said braking means.

30. In an automotive vehicle having an internal combustion engine and a throttle for controlling the flow of fuel to said engine for regulating the speed thereof, throttle control means, a driving wheel, a drive system affording a two-way driving connection between said engine and wheel whereby said engine may propel said vehicle, said drive system including a clutch which when disengaged breaks the driving connection between said engine and drive wheel, a device operable for discontinuing operation of the engine and locking said clutch in its disengaged position so as to permit said vehicle to coast free of said engine, said device being operable upon movement of said throttle control means to throttle closing position, and means for rendering said device inoperative when the speed of the vehicle is below a predetermined speed.

31. An automotive vehicle control according to claim 30 wherein said drive system includes a transmission having a neutral and an engaged position and wherein means are provided for rendering said device inoperable when said transmission is moved to its neutral position.

32. In an automotive vehicle having an internal combustion engine and a throttle for controlling the flow of fuel to said engine for regulating the speed thereof, throttle control means, a drive wheel, a drive system affording a two-way driving connection between said engine and wheel whereby said engine may propel said vehicle, said drive system including a clutch which when disengaged breaks the driving connection between said engine and drive wheel, a device operable for discontinuing operation of said engine and locking said clutch in its disengaged position so as to permit said vehicle to coast free of said engine, said device being operable upon movement of said throttle control means to throttle closing position and so long as the vehicle speed exceeds a predetermined minimum.

33. An automotive vehicle according to claim 32 wherein said engine includes a fuel induction system through which a combustible fuel mixture is supplied to the engine and wherein said device includes provisions for admitting non-combustible gas to said induction system.

34. An automotive vehicle according to claim 32 wherein said engine is provided with an ignition system and wherein said device for discontinuing operation of the engine includes means for rendering said ignition system inoperative.

35. An automotive vehicle having an internal combustion engine and a throttle for controlling the flow of fuel to said engine for regulating the speed thereof, a drive wheel, a drive system affording a two-way driving connection between said engine and wheel whereby said engine may propel said vehicle, said drive system including a normally engaged clutch which when released breaks the driving connection between said engine and drive wheel, a clutch pedal operable to release said clutch and movable after the clutch is released, a device operable in response to movement of said clutch pedal after release of said clutch for discontinuing operation of said engine, said engine including a fuel induction system controlled by said throttle and through which a combustible fuel mixture is supplied to the engine, and said device including means for admitting non-combustible gas to said induction system.

36. An automotive vehicle control according to claim 35 wherein said device includes provisions operable to prevent said engine from pumping oil into the combustion chambers thereof when said engine is decelerating after the operation thereof has been discontinued by said device.

37. An automotive vehicle control according to claim 35 wherein said engine includes an ignition system and wherein said device includes means for rendering said ignition system inoperable.

38. An automotive vehicle having an internal combustion engine, a drive wheel, a drive system affording a two-way driving connection between said engine and wheel whereby said engine may propel said vehicle, said drive system including a normally engaged clutch which when released breaks the driving connection between said engine and drive wheel, a clutch pedal movable from its normal position to release said clutch and movable further in the same direction as the clutch releasing movement after the clutch is released, a device operable by and in response to said further movement of said clutch pedal after release of said clutch for discontinuing operation of said engine, said device including provisions operable to prevent said engine from pumping oil into the combustion chambers thereof when the engine is decelerating after the operation thereof has been discontinued by said device.

39. In an automotive vehicle having an internal combustion engine, a drive wheel, a drive system providing a driving connection between said engine and said wheel whereby said engine may propel said vehicle, means operable during forward movement of the vehicle for breaking the driving connection between said engine and said wheel, and means operable concurrently with operation of the means for breaking said driving connection, for discontinuing operation of said engine to obtain free coasting of the vehicle with a dead engine, said means for discontinuing operation of said engine including provisions for preventing said engine from pumping oil into the combustion chambers thereof after engine operation is discontinued by said means 40. In an automotive vehicle having an internal combustion engine, a drive wheel, a drive system providing a driving connection between said engine and said wheel whereby said engine may propel said vehicle, said drive system including a clutch which when disengaged breaks the driving connection between said engine and said wheel, means operable when said engine is propelling said vehicle forwardly for disengaging said clutch, and means operable concurrently with the means for effecting disengagement of said clutch for discontinuing operation of said engine to obtain free coasting of the vehicle with a dead engine.

41. An automotive vehicle according to claim 40 wherein said engine is provided with a fuel induction system, and wherein said means for discontinuing operation of said engine comprises means for feeding non-combustible gases into said induction system.

42. An automotive vehicle according to claim 40 including speed responsive means operable when the speed of said vehicle falls below a predetermined rate while said vehicle is coasting free of said engine for effecting reengagement of said clutch and the starting of said engine.

43. An automotive vehicle according to claim 42 including inetrtia operated means operable upon violent deceleration of said vehicle for effecting operation of said speed responsive means at speeds above said predermined speed.

44. In an automotive vehicle having an internal combustion engine, a drive wheel, a drive system providing a driving connection between said engine and said wheel whereby said engine may propel said vehicle, said drive system including a clutch which when disengaged breaks the driving connection between said engine and said wheel, means for disengaging said clutch, and means operable concurrently with the means for effecting disengagement of said clutch, for discontinuing operation of said engine to obtain free coasting of the vehicle with a dead engine, said means for discontinuing operation of said engine being rendered inoperable upon reengagement of said clutch whereby reengagement of said clutch while said evhicle is moving will crank said engine for restarting the same.

45. In an automotive vehicle having an internal combustion engine, a drive wheel, a drive system providing a driving connection between said engine and said wheel whereby said engine may propel said vehicle, said drive system including a clutch, a fuel supplying system for said engine including a normally closed throttle for controlling the flow of fuel to said engine, means for controlling the position of said throttle, means for effecting disengagement of said clutch, means operable for discontinuing operation of said engine, and a device for effecting operation of said clutch disengaging means and said engine operation discontinuing means, said device being operable upon movement of said throttle control means into one position thereof.

46. An automotive vehicle according to claim 45 including means responsive to the positioning of said throttle control means and operable upon throttle opening movement of said throttle control means for disabling said device thereby permitting reengagement of said clutch and the starting of said engine.

47. An automotive vehicle according to claim 45 including speed responsive means operable when the speed of said vehicle falls below a predetermined rate for disabling said device.

48. An automotive vehicle according to claim 45 including speed responsive means associated with said device and operable for preventing disengagement of said clutch by said means when the speed of said vehicle is above a predetermined rate.

49. An automotive vehicle according to claim 47 including means operable upon violent deceleration of said vehicle for effecting operation of said speed responsive means to disable said device at speeds above said predetermined speed.

50. In an automotive vehicle having an internal combustion engine, a drive wheel, a drive system providing a driving connection between said engine and said wheel whereby said engine may propel said vehicle, said drive system including a clutch, a fuel supplying system for said engine including a normally closed throttle for controlling the flow of fuel to said engine, means for controlling the position of said throttle, means for effecting disengagement of said clutch, and means for discontinuing operation of said engine, said means for discontinuing operation of said engine being operable upon movement of said throttle control means so as to close said throttle, said means for effecting disengagement of said clutch being operable upon movement of said throttle control means into another position thereof while maintaining said throttle closed.

51. In an automotive vehicle having an internal combustion engine, a drive wheel, a drive system providing a driving connection between said engine and said wheel whereby said engine may propel said vehicle, said drive system including a clutch, a fuel supplying system for said engine including a normally closed throttle for controlling the flow of fuel to said engine, means for controlling the position of said throttle, and a device responsive to the positioning of said throttle control means and operable for killing said engine upon movement of said throttle control means into one position thereof, means responsive to engine operation for automatically disengaging said clutch, means responsive to movement of said throttle control means into another position thereof for rendering said device momentarily inoperative so as to permit disengagement of said clutch when said throttle control means is moved into said other position, a lockout for holding said clutch disengaged, a lockout circuit arranged to be energized upon movement of said throttle control means into said other position thereby holding said clutch disengaged, and means operable in connection with the energization of said lockout circuit for causing operation of said device.

52. An automotive vehicle according to claim 51 including speed responsive means for rendering said device inoperative when the speed of said vehicle is below a predetermined rate.

53. In an automotive vehicle having an engine, a drive wheel, a drive system providing a driving connection between said engine and said wheel whereby said engine may propel said vehicle, a fuel supplying system for said engine including a normally closed throttle for controlling the flow of fuel to said engine, means for controlling the position of said throttle, said driving system including a clutch which when released breaks the driving connection between said engine and wheel, means responsive to engine operation and operable when said throttle is closed for disengaging said clutch, means operable when said throttle is closed and said vehicle is moving above a predetermined speed for discontinuing operation of said engine, and means operable responsive to movement of said throttle control means for momentarily disabling said means to discontinue engine operation thereby permitting operation of said engine and effecting the disengagement of said clutch, said last-mentioned means being arranged to hold said clutch in its disengaged position.

54. In an automotive vehicle having an engine, a drive wheel, a drive system providing a driving connection between said engine and said wheel whereby said engine may propel said vehicle, a fuel supplying system for said engine including a normally closed throttle for controlling the flow of fuel to said engine, means for controlling the position of said throttle, said driving system including a clutch which when released breaks the driving connection between said engine and wheel, means responsive to engine operation for disengaging said clutch when said throttle is closed, a device for discontinuing operation of said engine, means for energizing said device including a speed responsive means arranged to be actuated when the speed of said vehicle is above a predetermined rate, and a throttle position responsive means arranged to be actuated when said throttle is closed, the actuation of said speed and throttle position responsive means effecting operation of said device, means operable responsive to movement of said throttle control means for momentarily deenergizing said device for permitting operation of said engine to thereby effect the disengagement of said clutch, said last-mentioned means being operable to hold said clutch in its disengaged position and to effect operation of said device after said clutch is disengaged.

55. In an automotive vehicle having an engine, a drive wheel, a drive system providing a driving connection between said engine and said wheel whereby said vehicle may propel said vehicle, a fuel supplying system for said engine including a normally closed throttle for controlling the flow of fuel to said engine, means for controlling the position of said throttle, said driving system including a clutch which when released breaks the driving connection between said engine and wheel, means operable for disengaging said clutch, a lockout operable for holding said clutch disengaged, a lockout circuit for energizing said lockout including a switch responsive to the positioning of said throttle control means, said switch being normally open and arranged to be closed in one position of said throttle control means for energizing said lockout thereby holding said clutch disengaged, means operable in connection with the energization of said lockout circuit for discontinuing operation of said engine, said switch being constructed and arranged so that opening of said switch will deenergize said lockout circuit and thereby render said lockout inoperative whereby said clutch will reengage, said means for discontinuing engine operation being rendered inoperative upon deenergization of said lockout circuit so as to permit starting of said engine by said driving system and said wheel.

56. In an automotive vehicle having an engine, a drive wheel, a drive system providing a driving connection between said engine and said wheel whereby said engine may propel said vehicle, a fuel supplying system for said engine including a normally closed throttle for controlling the flow of fuel to said engine, means for controlling the position of said throttle, means operable for breaking the driving connection between said engine and wheel, a lockout operable for maintaining said drive disconnected, means for energizing said lockout including a means responsive to the positioning of said throttle control means and arranged to be actuated in one position of said throttle control means for energizing said lockout, means operable in connection with the energization of said lockout for discontinuing operation of said engine, said means responsive to the position of said throttle control means being constructed and arranged so that movement of said throttle control means out of said one position will deenergize said lockout and thereby render said lockout inoperative.

57. In an automotive vehicle having an internal combustion engine, a drive wheel, a drive system providing a driving connection between said engine and said wheel, a fuel supplying system for said engine including a normally closed throttle for controlling the flow of fuel to said engine, said driving system including a clutch and a transmission adapted to be arranged to provide a forward drive of said vehicle, means operable for discontinuing operation of said engine, an electrical circuit in which said means is arranged including a vehicle speed responsive switch, a transmission position controlled switch, and a throttle switch, said speed responsive switch being normally open and arranged to be closed when the speed of said vehicle is above a predetermined rate, said transmission position controlled switch being normally open and arranged to be closed when said transmission is set for driving said vehicle forwardly, said throttle switch being normally open and arranged to be closed when said throttle is closed, the closing of all of said switches closing said circuit and energizing said means for discontinuing operation of said engine, said switches being constructed and arranged so that opening of any one of said switches will open said circuit and thereby render said means inoperative, so as to permit the starting of said engine by said driving system and said wheel.

58. An automotive vehicle according to claim 57 including a means responsive to deceleration of said vehicle and cooperable with said vehicle speed responsive switch for causing opening of the same at vehicle speeds above said predetermined speed upon violent deceleration of said vehicle.

59. In a vehicle having an internal combustion engine, a fuel supplying system for said engine including a fuel induction system and a throttle for controlling the flow of fuel to said engine, means controlling the position of said throttle, and an exhaust system for said engine, means for discontinuing operation of said engine comprising a chamber communicating with said induction system, a conduit adapted to be connected to said chamber and communicating with said exhaust system, a second conduit adapted to be connected to said chamber and communicating with atmosphere, valve means normally closing said first conduit and adapted to close said second conduit upon movement thereof to open said first conduit, a normally closed control valve in said chamber between said valve means and said induction system, means operable when said throttle is moved to its closed position by said throttle control means and said vehicle is moving forwardly above a predetermined speed for opening said control valve thereby establishing communication between said induction system and said second conduit, said valve means being connected to said control valve for movement therewith so as to open said first conduit and close said second conduit upon opening movement of said control valve, and means for causing a delay in the aforesaid movement of said valve means.

60. In a vehicle having an internal combustion engine, a fuel supplying system for said engine including a fuel induction system and a throttle for controlling the flow of fuel to said engine, means controlling the position of said throttle, and an exhaust system for said engine, means for discontinuing operation of said engine comprising a chamber communicating with said induction system, a conduit adapted to be connected to said chamber and to a source of a non-combustible gas, a second conduit adapted to be connected to said chamber and to a source of a non-combustible gas, valve means normally closing one of said conduits and adapted upon movement thereof to open said one conduit to close the other of said conduits, a normally closed control valve in said chamber between said valve means and said induction system, means operable when said throttle is moved to its closed position by said throttle control means and said vehicle is moving above a predetermined speed for opening said control valve thereby establishing communication between said chamber and the other of said conduits, and means connecting said valve means to said control valve for causing movement of said valve means so as to open said one conduit and close said other of said conduits in response to opening of said control valve.

61. A vehicle according to claim 60 wherein the connection between said valve means and said control valve comprises a lost motion connection so as to permit a delay in the movement of said valve means in response to movement of said control valve.

62. In an automotive vehicle having an internal combustion engine, a fuel supplying system for said engine including a fuel induction system and a throttle for controlling the flow of fuel to said engine, means controlling the position of said throttle, and an exhaust system for said engine, means for discontinuing operation of said engine comprising a chamber communicating with said induction system, a conduit adapted to be connected to said chamber and communicating with said exhaust system, a valve member normally closing said conduit, a normally closed control valve in said chamber between said valve member and said induction system, means operable when said throttle is moved to its closed position by said throttle control means and said vehicle is moving forwardly above a predetermined speed for opening said control valve, said control valve being connected to said valve member for moving the same so as to open said conduit and thereby establishing communication between said induction and exhaust systems in response to opening movement of said control valve, and means for causing a delay in the aforesaid opening movement of said valve member in response to movement of said control valve.

63. An automotive vehicle according to claim 62 including means operable upon opening of said control valve for feeding air into said induction system, said means being rendered inoperable upon movement of said valve member to open said conduit.

64. In an automotive vehicle having an internal combustion engine, a drive wheel, a drive system providing a driving connection between said engine and said wheel, a fuel supplying system for said engine including a normally closed throttle for controlling the flow of fuel to said engine, means controlling the position of said throttle, said driving system including a clutch and a transmission adapted to be arranged to provide a forward drive of said vehicle, a device operable for automatically discontinuing operation of said engine, and means for controlling operation of said device including a vehicle speed responsive means, a transmission position controlled means, and a means controlled by the position of said throttle control means, said speed responsive means being arranged to be actuated only when the speed of said vehicle is above a predetermined rate, said transmission position controlled means being arranged to be actuated when said transmission is set for driving said vehicle forwardly, said throttle position controlled means being arranged to be actuated when said throttle is closed, the actuation of said speed responsive means, said transmission position controlled means and said throttle controlled means energizing said device for discontinuing operation of said engine, all of said means being constructed and arranged so that the de-actuation of any one of said means deenergizes said device so as to permit the starting of said engine.

65. In an automotive vehicle having an internal combustion engine, a drive wheel, a drive system providing a driving connection between said engine and wheel, and operator controlled means for controlling the operation of said engine; means for discontinuing operation of said engine, means for effecting the breaking of the drive between said engine and wheel, and control means operable in response to the positioning of said operator controlled means and to the speed of said vehicle for effecting operation of said engine operation discontinuing means and said drive breaking means, said control means being operable when said operator controlled means is moved into one position thereof so long as the speed of said vehicle is within a predetermined range.

66. An automotive vehicle according to claim 65 wherein said control means is adapted to effect operation of said engine operation discontinuing means but is inoperable to effect operation of said drive breaking means when said operator controlled means is moved to another position thereof and said vehicle speed is above the lower limit of said predetermined range.

67. An automotive vehicle according to claim 65 including means responsive to rapid deceleration of said vehicle for disabling said control means.

68. In an automotive vehicle having an internal combustion engine, a drive wheel, a drive system providing a driving connection between said engine and wheel, said drive system including a clutch adapted to be engaged to form a part of said driving connection when said engine is driving said vehicle, a fuel supply system including a throttle for regulating the flow of fuel to said engine, means controlling the position of said throttle, means for effecting disengagement of said clutch, means for discontinuing operation of said engine, and control means responsive to the position of said throttle control means and to the speed of said vehicle for effecting operation of said clutch disengaging means and said engine operation discontinuing means to thereby disengage said clutch and discontinue engine operation, said control means being operable when said throttle is closed by said throttle control means and the speed of said vehicle is within a predetermined range.

69. An automotive vehicle according to claim 68, including means for rendering said control means inoperable to effect operation of the means for effecting disengagement of said clutch when the speed of said vehicle is above the upper limit of said predetermined range and said throttle is closed.

References Cited in the file of this patent

UNITED STATES PATENTS

| | | |
|---|---|---|
| 1,627,985 | Mason | May 10, 1927 |
| 1,813,719 | White | July 7, 1931 |
| 1,961,062 | Mallory | May 29, 1934 |
| 1,996,282 | Drabin et al. | Apr. 2, 1935 |
| 2,028,198 | Elliott | Jan. 21, 1936 |
| 2,075,272 | Dach | Mar. 30, 1937 |